US012811813B2

(12) United States Patent
Shao

(10) Patent No.: US 12,811,813 B2
(45) Date of Patent: Nov. 24, 2026

(54) COMMUNICATION VOLUME REDUCTION DURING BLOCK CONSENSUS

(71) Applicant: Tencent Technology (Shenzhen) Company Limited, Shenzhen (CN)

(72) Inventor: Zhuguang Shao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 196 days.

(21) Appl. No.: 18/370,340

(22) Filed: Sep. 19, 2023

(65) Prior Publication Data

US 2024/0015037 A1 Jan. 11, 2024

Related U.S. Application Data

(63) Continuation of application No. PCT/CN2023/090018, filed on Apr. 23, 2023.

(30) Foreign Application Priority Data

Jul. 8, 2022 (CN) ........................ 202210800712.6

(51) Int. Cl.
*H04L 9/00* (2022.01)

(52) U.S. Cl.
CPC ..................................... *H04L 9/50* (2022.05)

(58) Field of Classification Search
CPC ......................................................... H04L 9/50

(Continued)

(56) References Cited

U.S. PATENT DOCUMENTS

2019/0036712 A1* 1/2019 Qiu .................. G06Q 20/38215
2020/0127945 A1* 4/2020 Yang ..................... H04L 49/557

(Continued)

FOREIGN PATENT DOCUMENTS

CN 110570202 A 12/2019
CN 110708171 A * 1/2020 ........... H04L 9/3236

(Continued)

OTHER PUBLICATIONS

Liang et al., SBHPS: A High Performance Consensus Algorithm For Blockchain, 2021 International Conference on High Performance Big Data and Intelligent Systems, IEEE, pp. 1-6 (2021) (Year: 2021).*

(Continued)

*Primary Examiner* — David P Zarka
(74) *Attorney, Agent, or Firm* — Morgan, Lewis & Bockius LLP

(57) ABSTRACT

This application discloses a data processing method for a consensus network performed by a first consensus node. The first consensus node receives a first block broadcast by a second consensus node in a second consensus sub-network and performs consensus processing on the first block, to obtain a consensus result of the first consensus node for the first block. When the consensus result for the first block is a consensus success result, the first consensus node broadcasts the first block in a first consensus sub-network, to perform consensus processing on the first block in the first consensus sub-network. The consensus success result of the first consensus node for the first block is then broadcast in the consensus network, and on-chain processing is performed on the first block based on a first quantity of consensus success results for the first block in the consensus network.

18 Claims, 12 Drawing Sheets

(58) Field of Classification Search
USPC .......................................................... 713/193
See application file for complete search history.

(56) References Cited

U.S. PATENT DOCUMENTS

| | | | | |
|---|---|---|---|---|
| 2020/0235988 | A1* | 7/2020 | Lin | G06F 16/27 |
| 2021/0135848 | A1* | 5/2021 | Li | H04L 9/3247 |
| 2021/0256007 | A1* | 8/2021 | Wu | H04L 9/3239 |
| 2021/0314167 | A1* | 10/2021 | Liao | H04L 9/3247 |
| 2021/0328791 | A1* | 10/2021 | Wei | G06F 21/57 |
| 2021/0344501 | A1* | 11/2021 | Li | H04L 9/3239 |
| 2022/0239496 | A1 | 7/2022 | Shao et al. | |
| 2023/0262126 | A1* | 8/2023 | Liu | H04L 9/50 709/203 |

FOREIGN PATENT DOCUMENTS

| | | | | | |
|---|---|---|---|---|---|
| CN | 112150141 | A | * | 12/2020 | H04L 9/50 |
| CN | 112417056 | A | * | 2/2021 | G06F 16/27 |
| CN | 113254272 | A | | 8/2021 | |
| CN | 113518005 | A | * | 10/2021 | H04L 67/104 |
| KR | 101949712 | B1 | | 2/2019 | |
| KR | 20220006623 | A | | 1/2022 | |

OTHER PUBLICATIONS

Tencent Technology, ISR, PCT/CN2023/090018, Jun. 21, 2023, 2 pgs.

Tencent Technology, Korean Office Action, KR Patent Application No. 10-2023-7038211, Dec. 18, 2024, 9 pgs.

Tencent Technology, Extended European Search Report, EP Patent Application No. 23790211.9, Aug. 30, 2024, 6 pgs.

Daniel Cason et al., "The Design, Architecture and Performance of the Tendermint Blockchain Network", 40th International Symposium on Reliable Distributed Systems (SRDS), Sep. 2021, 11 pgs.

Xiubo Liang et al., "SBHPS: A High-Performance Consensus Algorithm for Blockchain", International Conference on High Performance Big Data and Intelligent Systems (HPBD&IS), Dec. 2021, 6 pgs.

* cited by examiner

COMMUNICATION VOLUME REDUCTION DURING BLOCK CONSENSUS

CROSS-REFERENCE TO RELATED APPLICATIONS

This application is a continuation application of PCT Patent Application No. PCT/CN2023/090018, entitled "DATA PROCESSING METHOD AND APPARATUS FOR CONSENSUS NETWORK, PROGRAM PRODUCT, DEVICE, AND MEDIUM" filed on Apr. 23, 2023, which claims priority to Chinese Patent Application No. 202210800712.6, entitled "DATA PROCESSING METHOD AND APPARATUS FOR CONSENSUS NETWORK, PROGRAM PRODUCT, DEVICE, AND MEDIUM" and filed with the China National Intellectual Property Administration on Jul. 8, 2022, all of which is incorporated herein by reference in its entirety.

FIELD OF THE TECHNOLOGY

This application relates to the field of blockchain technologies, and in particular, to a data processing method and apparatus for a consensus network, a program product, a device, and a medium.

BACKGROUND OF THE DISCLOSURE

A blockchain is a new application mode of computer technologies such as distributed data storage, point-to-point transmission, a consensus mechanism, and an encryption algorithm. On-chain processing can be performed on a block in a blockchain network only after consensus on the block is successful in a consensus network.

When consensus processing is performed on the block in the consensus network, consensus processing needs to be performed after the block is broadcast between consensus nodes in the consensus network. However, when a scale of the consensus network is excessively large, and there are a large quantity of consensus nodes, a communication volume during broadcast and consensus on the block in the consensus network is excessively large. As a result, processing performance of the whole consensus network is greatly degraded.

SUMMARY

This application provides a data processing method and apparatus for a consensus network, a program product, a device, and a medium, which can reduce a communication volume during consensus on a block in the consensus network, and improve efficiency and performance for consensus on the block in the consensus network.

An aspect of this application provides a data processing method for a consensus network. The consensus network includes a first consensus node and a second consensus node, N being a positive integer. The method is performed by the first consensus node and includes:

in response to a consensus process for the first block being initiated by a first master node of the consensus network, receiving, by the first consensus node, a first block broadcast from the second consensus node in a second consensus sub-network, the second consensus sub-network comprising K consensus nodes in the N consensus nodes and including both the first consensus node and the second consensus node, K being a positive integer less than N;

performing, by the first consensus node, consensus processing on the first block in the second consensus sub-network, to obtain a consensus result of the first consensus node for the first block; and in response to determining that the consensus result of the first consensus node for the first block is a consensus success result, broadcasting, by the first consensus node, the first block to a first consensus sub-network to which the first consensus node belongs, to continue to perform consensus processing on the first block in the first consensus sub-network, the first consensus sub-network comprising M consensus nodes in the N consensus nodes, M being a positive integer less than N, wherein an on-chain processing is performed on the first block based on a first quantity of consensus success results for the first block in the consensus network.

An aspect of this application provides a computer device acting as a first consensus node of a consensus network that comprises N consensus nodes including the first consensus node and a second consensus node, N being a positive integer, the computer device including a memory and a processor, the memory storing a computer program, the computer program, when executed by the processor, causing the computer device to perform the method according to an aspect of this application.

An aspect of this application provides a non-transitory computer-readable storage medium, storing a computer program including program instructions, the program instructions, when executed by a processor of a computer device acting as a first consensus node of a consensus network that comprises N consensus nodes including the first consensus node and a second consensus node, N being a positive integer, causing the computer device to perform the method according to the foregoing aspect.

In this application, the consensus network includes N consensus nodes. A first master node in the consensus network may initiate a consensus process for a first block. In the consensus process for the first block, a first consensus node may receive the first block broadcast by a second consensus node in a second consensus sub-network. The second consensus sub-network includes K consensus nodes in the N consensus nodes, both the first consensus node and the second consensus node belong to the second consensus sub-network, and the second consensus node is any one of the N consensus nodes other than the first consensus node, K being a positive integer less than N. In other words, compared with the consensus network, the second consensus sub-network is a small-scale network. Consensus processing is performed on the first block in the second consensus sub-network to obtain a consensus result of the first consensus node for the first block. When it is determined that the consensus result of the first consensus node for the first block is a consensus success result, the first block is broadcast in a first consensus sub-network to which the first consensus node belongs, to continue to perform consensus processing on the first block in the first consensus sub-network. The first consensus sub-network includes M consensus nodes in the N consensus nodes, M being a positive integer less than N. In other words, compared with the consensus network, the first consensus sub-network is also a small-scale network. In this way, consensus in the large-scale consensus network is converted into consensus in several small-scale consensus sub-networks. The consensus success result of the first consensus node for the first block is broadcast in the consensus network, a first quantity of consensus success results for the first block in the consensus network is obtained, and on-chain processing is performed on the first block based on the first quantity. Therefore, in the method provided in this application, each consensus node can broadcast a block in a small network (for example, the first consensus sub-network and the second consensus sub-network) of the consensus network, to further perform consensus processing on the block in the small network, which can reduce a communication volume during consensus processing on the block, and improve efficiency and performance for consensus on the block in the consensus network.

BRIEF DESCRIPTION OF THE DRAWINGS

To describe the technical solutions in this application or the related art more clearly, the following briefly describes the accompanying drawings required for describing the embodiments or the related art. The accompanying drawings in the following description show only some embodiments of this application, and other embodiments or variants are also contemplated.

DESCRIPTION OF EMBODIMENTS

The technical solutions of this application are clearly and completely described below with reference to the accompanying drawings of this application. Apparently, the described embodiments are merely some rather than all of the embodiments of this application. All other embodiments obtained by a person of ordinary skill in the art based on the embodiments of this application without creative efforts shall fall within the protection scope of this application.

This application relates to the related art of a blockchain. The blockchain is a new application mode of computer technologies such as distributed data storage, point-to-point transmission, a consensus mechanism, and an encryption algorithm. The blockchain is essentially a decentralized database and a series of associated data blocks generated in a cryptographic manner. Each data block includes information about a batch of network transactions for verifying the validity of the information (for anti-counterfeiting) and generating a next block. The blockchain may include a blockchain underlying platform, a platform product service layer, and an application service layer. The blockchain includes a series of blocks that are consecutive in a chronological order of generation. Once a new block is added to the blockchain, the new block is no longer removed. The block records recorded data submitted by the node in the blockchain system. In this application, a large-scale consensus network may be converted into several small-scale consensus sub-networks to implement consensus processing on a block, to improve performance and efficiency for consensus processing on the block in the consensus network.

This application may relate to a cloud technology, for example, blockchain nodes (for example, consensus nodes) can communicate with each other through "cloud".

All data (for example, a block and service data in the block) acquired in this application is acquired when on object (for example, a user) to which the service data belongs agrees and authorizes separately, and acquisition, use, and processing of related data need to comply with the relevant laws and standards of the relevant countries and regions.

Figure 1:
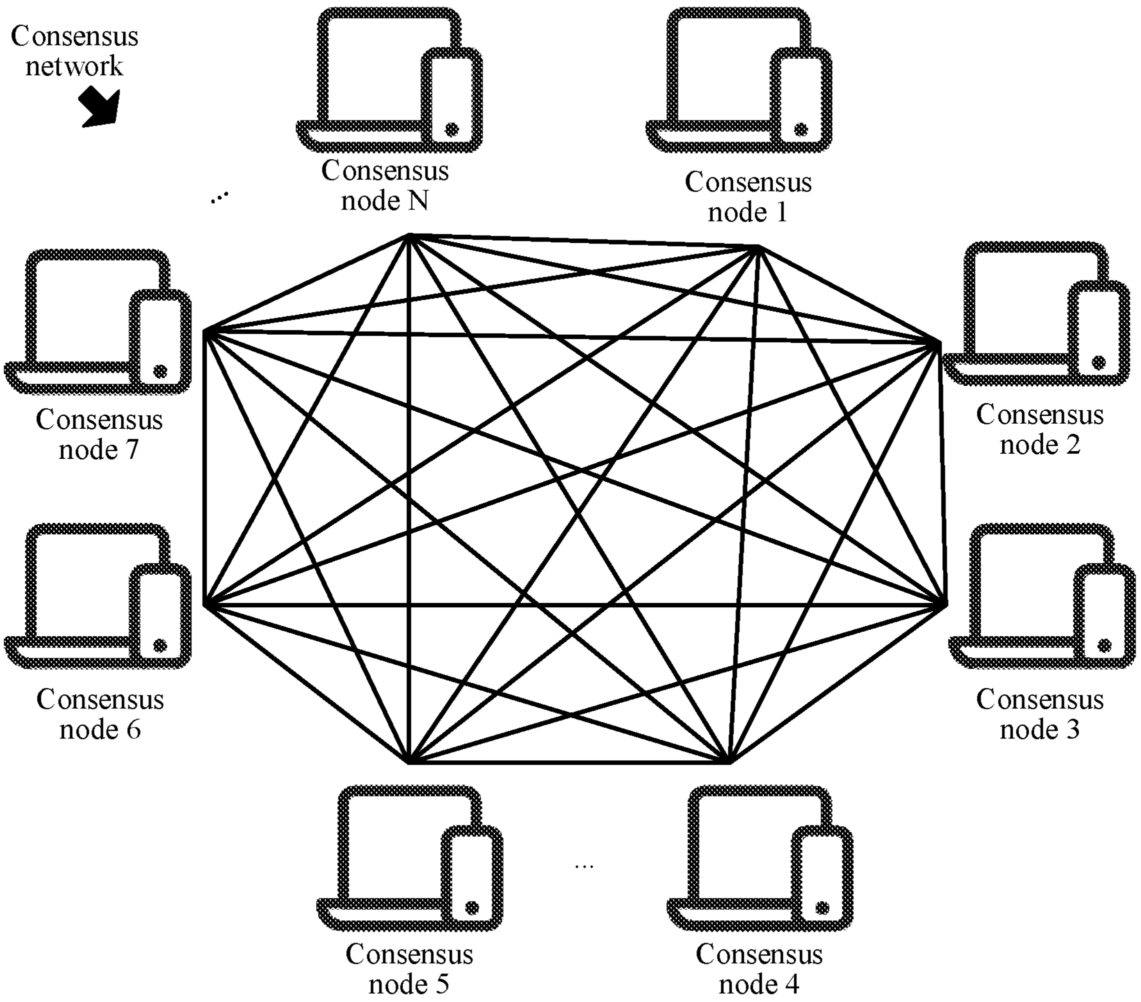
FIG. 1 is a schematic structural diagram of a network architecture of a consensus network according to this application.

Referring to FIG. 1, FIG. 1 is a schematic structural diagram of a network architecture of a consensus network according to this application. As shown in FIG. 1, the consensus network may include a plurality of consensus nodes, including a consensus node 1 to a consensus node N, where N is a positive integer, and a value of N is determined based on an actual application scenario. Any consensus node may include one or more computer devices. The computer device may be a terminal device, or may be a server, or the like.

When the computer device forming the consensus node is a server, the server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. When the computer device forming the consensus node is a terminal device, the terminal device may be a smart terminal such as a smartphone, a tablet computer, a notebook computer, a desktop computer, a smart television, or an in-vehicle terminal.

Figure 2:
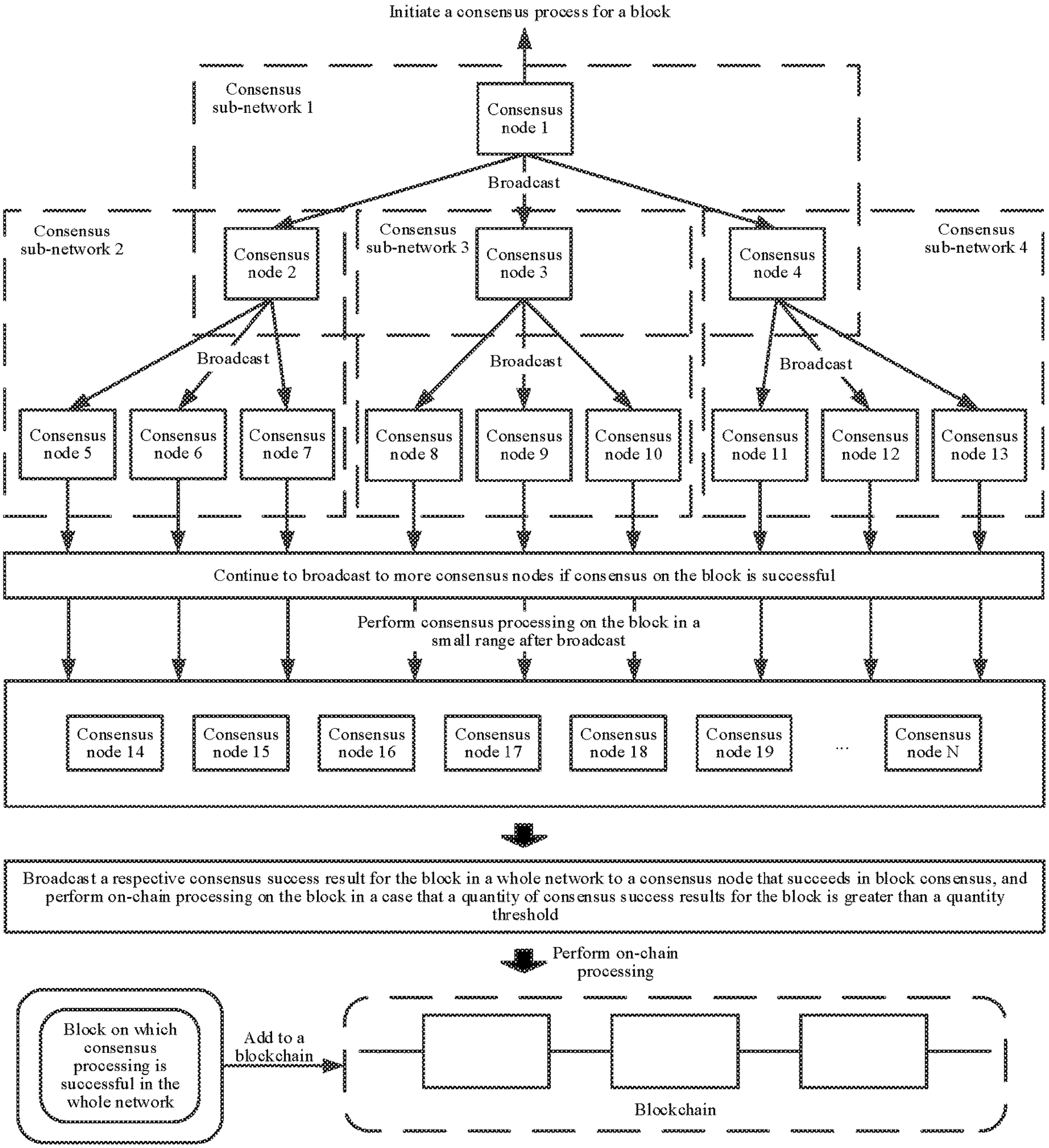
FIG. 2 is a schematic diagram of a scenario of block consensus according to this application.

Referring to FIG. 2, FIG. 2 is a schematic diagram of a scenario of block consensus according to this application. As shown in FIG. 2, rotation may be performed on a master node in the consensus network, and the consensus node 1 may be a master node that currently initiates proposal consensus on a block. The consensus node 1 may first broadcast, to a corresponding consensus sub-network 1, a block on which consensus processing needs to be performed. The consensus sub-network 1 may include the consensus node 1, a consensus node 2, a consensus node 3, and a consensus node 4.

Further, consensus processing may be performed on a block initiated by the consensus node 1 in the consensus sub-network 1. After consensus processing is completed, each consensus node in the consensus sub-network 1 may respectively obtain a consensus result of the consensus node for the block. The consensus result is a consensus result (for example, a consensus success result or a consensus failure result) of each consensus node respectively for the block, instead of a final consensus result of all consensus nodes in the consensus sub-network 1 for the block. Consensus results of consensus nodes for the block may be the same or different.

When consensus for the block succeeds on the consensus node 2, that is, a consensus result of the consensus node 2 for the block is a consensus success result, the consensus node 2 may further continue to broadcast the block to a corresponding consensus sub-network 2. The consensus sub-network 2 may include the consensus node 2, a consensus node 5, a consensus node 6, and a consensus node 7. Further, consensus processing may be continued on a block initiated by a consensus node in the consensus sub-network 2. After consensus processing is completed, each consensus node in the consensus sub-network 2 may also respectively obtain a consensus result of the consensus node for the block.

Similarly, when consensus for the block succeeds on the consensus node 3, that is, a consensus result of the consensus node 3 for the block is a consensus success result, the consensus node 3 may further continue to broadcast the block to a corresponding consensus sub-network 3. The consensus sub-network 3 may include the consensus node 3, a consensus node 8, a consensus node 9, and a consensus node 10. Further, consensus processing may be continued on a block initiated by a consensus node in the consensus sub-network 3. After consensus processing is completed, each consensus node in the consensus sub-network 3 may also respectively obtain a consensus result of the consensus node for the block.

Similarly, when consensus for the block succeeds on the consensus node 4, that is, a consensus result of the consensus node 4 for the block is a consensus success result, the consensus node 4 may further continue to broadcast the block to a corresponding consensus sub-network 4. The consensus sub-network 4 may include the consensus node 4, a consensus node 11, a consensus node 12, and a consensus node 13. Further, consensus processing may be continued on a block initiated by a consensus node in the consensus sub-network 4. After consensus processing is completed, each consensus node in the consensus sub-network 4 may also respectively obtain a consensus result of the consensus node for the block.

Further, a consensus node in the consensus node 5, the consensus node 6, the consensus node 7, the consensus node 8, the consensus node 9, the consensus node 10, the consensus node 11, the consensus node 12, and the consensus node 13 that succeeds in consensus on a block may further continue to broadcast the block to more consensus nodes in the consensus network (for example, broadcast to a corresponding consensus sub-network), to continue to perform consensus processing on the block, so that consensus processing is performed on the block in the whole consensus network after broadcast and consensus processing are continuously performed on the block in each consensus sub-network.

In this way, a consensus node that succeeds in block consensus in the consensus network may broadcast a respective consensus success result for the block in the whole network (the whole consensus network). When a quantity of consensus results for the block that are obtained by each consensus node in the consensus network is greater than or equal to a quantity threshold of consensus success results, it indicates that consensus processing on the block is successful in the whole network, and on-chain processing may be performed on the block, for example, the block may be added to a blockchain to which the consensus network belongs. For a specific process of performing consensus processing on the block, reference may be made to descriptions in an embodiment corresponding to FIG. 3.

According to the method in this application, consensus processing is performed on a block in each small network (for example, each small-scale consensus sub-network) instead of being performed on a block in the whole consensus network, to reduce communication complexity during consensus processing on the block, reduce a communication volume during consensus processing on the block, improve efficiency of performing consensus processing on the block, and improve performance of performing consensus processing on the block in the whole consensus network.

Figure 3:
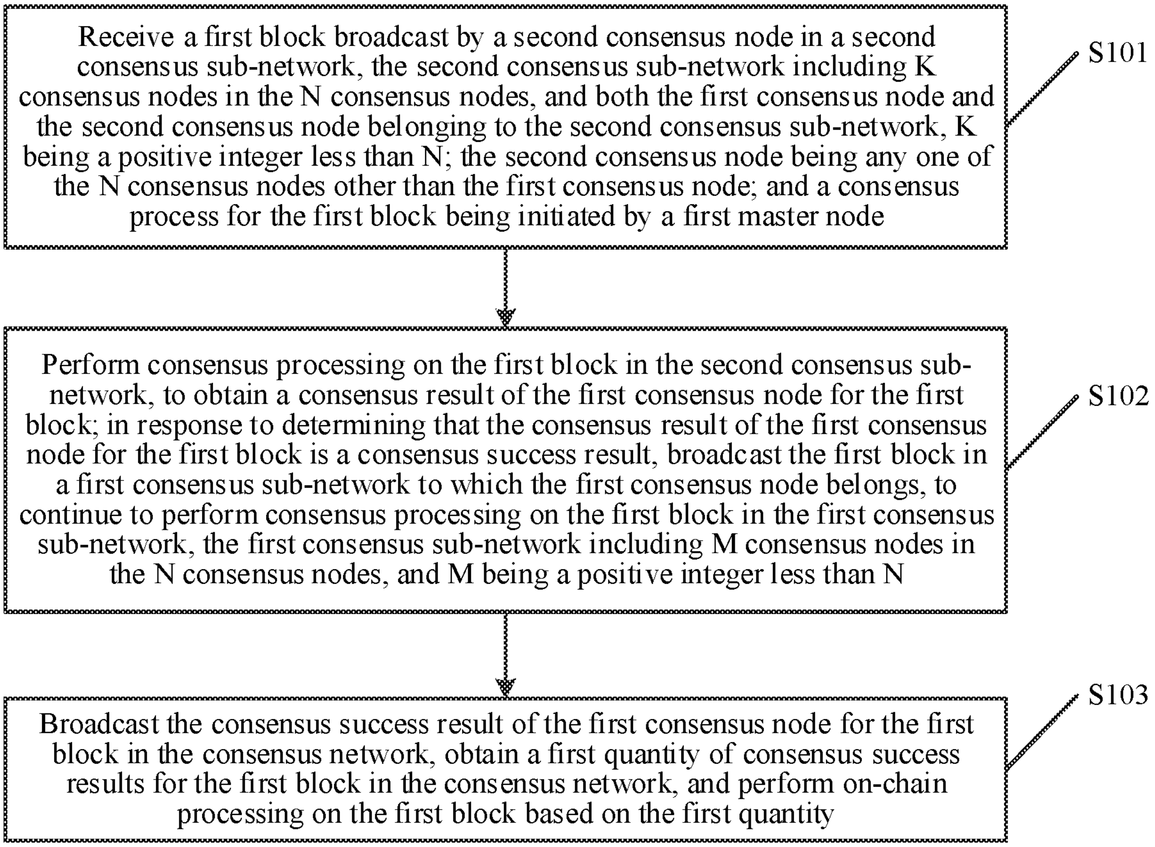
FIG. 3 is a schematic flowchart of a data processing method for a consensus network according to this application.

Referring to FIG. 3, FIG. 3 is a schematic flowchart of a data processing method for a consensus network according to this application. As shown in FIG. 3, the method may include the following steps:

S101: Receive a first block broadcast by a second consensus node in a second consensus sub-network, the second consensus sub-network including K consensus nodes in the N consensus nodes, and both the first consensus node and the second consensus node belonging to the second consensus sub-network, K being a positive integer less than N; the second consensus node being any one of the N consensus nodes other than the first consensus node; and a consensus process for the first block being initiated by the first master node.

In a possible implementation, the consensus network may include N consensus nodes, the N consensus nodes may be blockchain nodes that perform consensus processing on a block on which on-chain processing needs to be performed, N is a positive integer, and a specific value of N may be determined based on an actual application scenario. Any consensus node may include one or more computer devices. The computer device may be a server or a terminal device, which may alternatively be determined based on an actual application scenario. This is not limited herein.

The N consensus nodes may include a first master node. The first master node is a master node that currently needs to initiate proposal consensus on a block. Generally, the first master node may be a consensus node. In other words, the first master node may be a consensus node that is currently configured to initiate consensus processing on the block. Therefore, it may be understood that, an execution entity in this embodiment of this application may be a first consensus node, and the first consensus node may be any consensus node in the N consensus nodes other than the first master node.

In this way, the first consensus node may receive a first block broadcast by the second consensus node in the second consensus sub-network. The first block is a block on which consensus processing currently needs to be performed. The consensus process for the first block may be initiated by the first master node, a proposal on the first block may be first initiated by the first master node, the first block may be generated by the first master node, and the first block may include any service data on which on-chain processing needs to be performed, for example, transaction data, and the like.

In a possible implementation, the method provided in this embodiment of this application may be performed to improve a consensus process of TendermintBFT (TBFT for short, which is a consensus algorithm). In the TBFT, rotation may be performed on a master node in the consensus network. There may be a plurality of rotation manners. For example, each consensus node in the consensus network may respectively has a corresponding node number, so that the master node in the consensus network may sequentially perform rotation based on a node number of each consensus node, or the master node in the consensus network may also perform rotation based on another policy, where each consensus node in the consensus network can know a rotation policy of the master node. In this way, in a consensus network using the TBFT, each consensus node may know which consensus node is a master node at a moment without notifying each other.

Therefore, the method provided in this application may be performed to convert a large-scale consensus network in the TBFT into several small networks (for example, several consensus sub-networks) to perform consensus processing on a block, to reduce a data volume during data broadcast in consensus processing, and reduce communication complexity during data broadcast in consensus processing.

The second consensus node may be any consensus node in the N consensus nodes other than the first consensus node. The second consensus sub-network may be understood as a consensus sub-network corresponding to the second consensus node, the second consensus sub-network may be a sub-network (which is also referred to as a small network or a small-scale network) in the consensus network, and the second consensus sub-network may include K consensus nodes, where K is a positive integer less than N, K may be relatively less than N, and a value of N may be determined based on an actual application scenario. Both the first consensus node and the second consensus node belong to the second consensus sub-network, that is, the second consensus sub-network includes the first consensus node and the second consensus node.

First remaining consensus nodes in the K consensus nodes may be K−1 consensus nodes that are selected (which may be randomly selected) by the second consensus node from the N consensus nodes and that are interconnected (i.e., communicated) with the second consensus node. The K−1 consensus nodes may be consensus nodes to which the second consensus node may broadcast a block when obtaining the block on which consensus processing needs to be performed. The first remaining consensus nodes may be consensus nodes in the K consensus nodes other than the second consensus node. Alternatively, in a possible implementation, the K−1 consensus nodes may also be consensus nodes that are selected based on a routing table and that have a route closer to the second consensus node, or the K−1 consensus nodes may also be preset consensus nodes to which the second consensus node may broadcast the block on which consensus processing needs to be performed. When the K−1 consensus nodes are preset, the K−1 consensus nodes may be intermittently updated, for example, may be updated at intervals (such as every other period). During update, a value of K may also be updated, that is, a quantity of consensus nodes to which the second consensus node may broadcast the block on which consensus processing needs to be performed may also be changed. In other words, several consensus nodes to which the second consensus node may broadcast the block on which consensus processing needs to be performed may be periodically updated and dynamically changed. In a possible implementation, how to determine a second consensus sub-network corresponding to the second consensus node may be determined based on an actual application scenario. This is not limited herein.

The second consensus sub-network may be understood as a virtual consensus sub-network that is generated when the second consensus node broadcasts the first block and that is configured to broadcast the first block. The consensus sub-network may not be an independent sub-network obtained through pre-division.

It may be understood that, when the second consensus node is the first master node, the first block broadcast by the second consensus node may be generated by the second consensus node, and the second consensus node initiates the consensus process for the first block. However, when the second consensus node is not the first master node, the first block broadcast by the second consensus node may be broadcast by a third consensus node in the N consensus nodes to the second consensus node, where the third consensus node is any consensus node in the N consensus nodes other than the first consensus node and the second consensus node. A principle of broadcasting the first block to the second consensus node by the third consensus node in the N consensus nodes is the same as a principle of broadcasting the first block to the first consensus node by the second consensus node, for example, the first block may also be broadcast to a corresponding consensus sub-network, where the consensus sub-network may include the second consensus node.

In other words, the first block may initially be generated by the first master node and broadcast to a corresponding consensus sub-network, the first block received by each consensus node in a consensus sub-network corresponding to the first master node may be broadcast by the first master node, and the first block received by remaining consensus nodes in the N consensus nodes may be broadcast by consensus nodes in the N consensus nodes other than the first master node. The remaining consensus nodes may be consensus nodes in the N consensus nodes other than consensus nodes included in the consensus sub-network corresponding to the first master node.

S102: Perform consensus processing on the first block in the second consensus sub-network, to obtain a consensus result of the first consensus node for the first block; and in response to determining that the consensus result of the first consensus node for the first block is a consensus success result, broadcast the first block in a first consensus sub-network to which the first consensus node belongs, to continue to perform consensus processing on the first block in the first consensus sub-network, the first consensus sub-network including M consensus nodes in the N consensus nodes, and M being a positive integer less than N.

In a possible implementation, after receiving the first block broadcast by the second consensus node, the first consensus node may perform consensus processing on the first block in the second consensus sub-network, to obtain the consensus result of the first consensus node for the first block. In other words, consensus nodes in the second consensus sub-network may perform consensus processing on the first block together. In a possible implementation, each consensus node in the second consensus sub-network may perform consensus processing on the first block by using a BTFT consensus algorithm. The consensus processing may include three consensus phases, including a propose phase, a prevote phase, and a precommit phase. In the prevote phase and the precommit phase, data (for example, voting data for the first block) that needs to be broadcast to each other exists in the consensus nodes in the second consensus sub-network.

After each consensus node in the second consensus sub-network jointly performs consensus processing on the first block in the three consensus phases, each consensus node in the second consensus sub-network may receive a respective consensus result of the consensus node for the first block.

The consensus result may be a consensus success result or a consensus failure result, and consensus results obtained by different consensus nodes for the first block may be the same or different. The consensus success result indicates that consensus processing on the first block is successful, and on-chain processing is agreed to be performed on the first block. Conversely, the consensus failure result indicates that consensus processing on the first block is not successful, and on-chain processing is not agreed to be performed on the first block.

It may be understood that, the first master node is a master node of the current whole consensus network and is configured to propose for a block. Regardless of whether the second consensus node is the first master node, the second consensus node may be understood as a "master node" in the second consensus sub-network, which may be understood that, in the second consensus sub-network, proposal consensus on the first block is initiated by the second consensus node.

Therefore, when consensus processing on the first block is successful on the first consensus node (that is, the first consensus node obtains a consensus success result of the first consensus node for the first block), the first consensus node may continue to broadcast the first block in a corresponding consensus sub-network (which may be referred to as the first consensus sub-network), to continue to perform consensus processing on the first block in the first consensus sub-network.

Similarly, the first consensus sub-network may be a sub-network (a small network) in the consensus network, and the first consensus sub-network may include M consensus nodes, where M is a positive integer less than N, a value of M and the value of K may be the same or different, which may be specifically determined based on an actual application scenario. Second remaining consensus nodes in the M consensus nodes may be M−1 consensus nodes that are selected (for example, randomly selected) by the first consensus node from the N consensus nodes and that are in communication with the first consensus node. The second remaining consensus nodes may be consensus nodes in the M consensus nodes other than the first consensus node.

The M−1 consensus nodes may be consensus nodes to which a block may be broadcast when the first consensus node obtains the block (for example, the first block) on which consensus processing needs to be performed. Alternatively, in a possible implementation, the M−1 consensus nodes may also be consensus nodes that are selected based on a routing table and that have a route closer to the first consensus node, or the M−1 consensus nodes may also be preset consensus nodes to which the first consensus node may broadcast the block on which consensus processing needs to be performed. When the M−1 consensus nodes are preset, the M−1 consensus nodes may also be intermittently updated, for example, may be updated at intervals (such as every other period). During update, a value of M may also be updated, that is, a quantity of consensus nodes to which the first consensus node may broadcast the block on which consensus processing needs to be performed may also be changed. In other words, several consensus nodes to which the first consensus node may broadcast the block on which consensus processing needs to be performed may be periodically updated and dynamically changed. In a possible implementation, how to determine a first consensus sub-network corresponding to the first consensus node may also be determined based on an actual application scenario. This is not limited herein.

Similarly, the first consensus sub-network may also be understood as a virtual consensus sub-network that is generated when the first consensus node broadcasts the first block and that is configured to broadcast the first block. The consensus sub-network may not be an independent sub-network obtained through pre-division.

However, when consensus processing is performed on the first block in the second consensus sub-network, and consensus processing on the first block is not successful on the first consensus node, the first consensus node does not need to continue to broadcast the first block to a corresponding first consensus sub-network, and may only need to record a consensus failure result for the first block.

Similarly, after the first consensus node broadcast the first block in the first consensus sub-network to which the first consensus node belongs, each consensus node in the first consensus sub-network may continue to perform consensus processing in the three phases on the first block, and each consensus node in the first consensus sub-network may also obtain a consensus result of the consensus node for the first block. The consensus result may be a consensus success result or a consensus failure result. By analogy, a consensus node in the first consensus sub-network that obtains the consensus success result for the first block may continue to broadcast the first block to a corresponding consensus sub-network, to continue to perform consensus processing on the first block in the consensus sub-network.

Similarly, the first master node may be a master node in the current whole consensus network and is configured to propose for a block. The first consensus node may be understood as a "master node" in the first consensus sub-network, which may be understood that, in the first consensus sub-network, proposal consensus on the first block is initiated by the first consensus node.

Through the foregoing process, it may be understood that, the first block is continuously broadcast between consensus sub-networks, a whole consensus process (including the three consensus phases) may be respectively performed on the first block in the consensus sub-networks, and finally consensus processing on the first block in the whole consensus network may be implemented. Since the last two consensus phases (including the prevote phase and the precommit phase) in the three consensus phases have consensus data (for example, voting data) broadcast to each other between consensus nodes that need to perform consensus processing on a block, when the data is broadcast to each other in the whole consensus network including N consensus nodes, communication complexity is $O(N^2)$.

Therefore, according to the method provided in this application, when consensus processing in the three consensus phases is performed on the block, in the last two phases, consensus nodes also need to broadcast the consensus data to each other only in a corresponding consensus sub-network without broadcasting the consensus data to each other in the whole large-scale consensus network, thereby reducing a volume of data needs to be broadcast and transmitted during consensus processing, and reducing communication complexity during consensus processing.

The manner of continuously broadcasting and performing consensus processing on the first block based on each consensus sub-network is implemented based on a principle of a gossip protocol (which is a communication protocol). Consensus in a large-scale node is converted into consensus in several small-scale nodes, which can improve consensus performance of a whole blockchain.

Figure 4A:
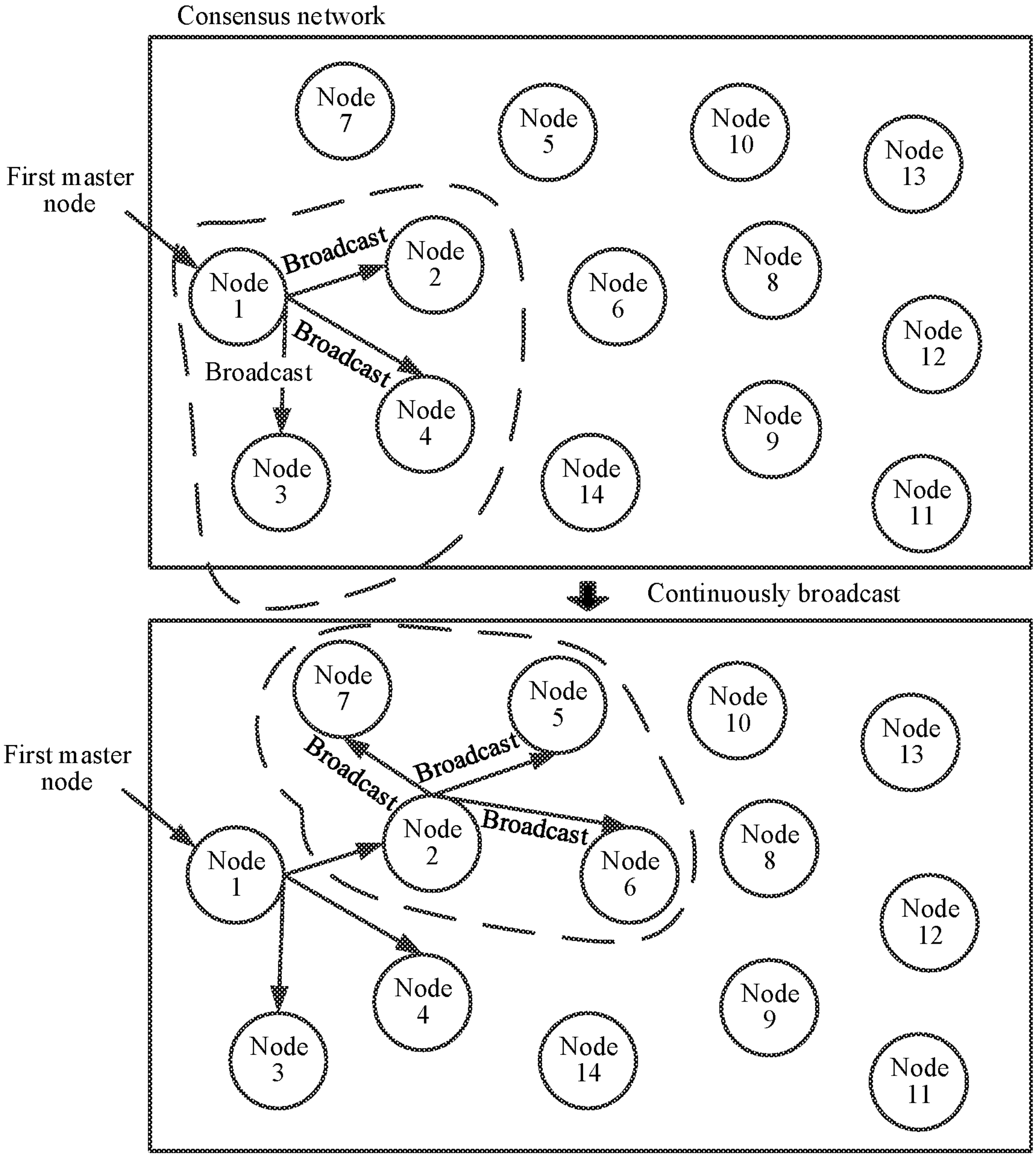
FIG. 4A and FIG. 4B are schematic diagrams of scenarios of block broadcast according to this application.
Figure 4B:
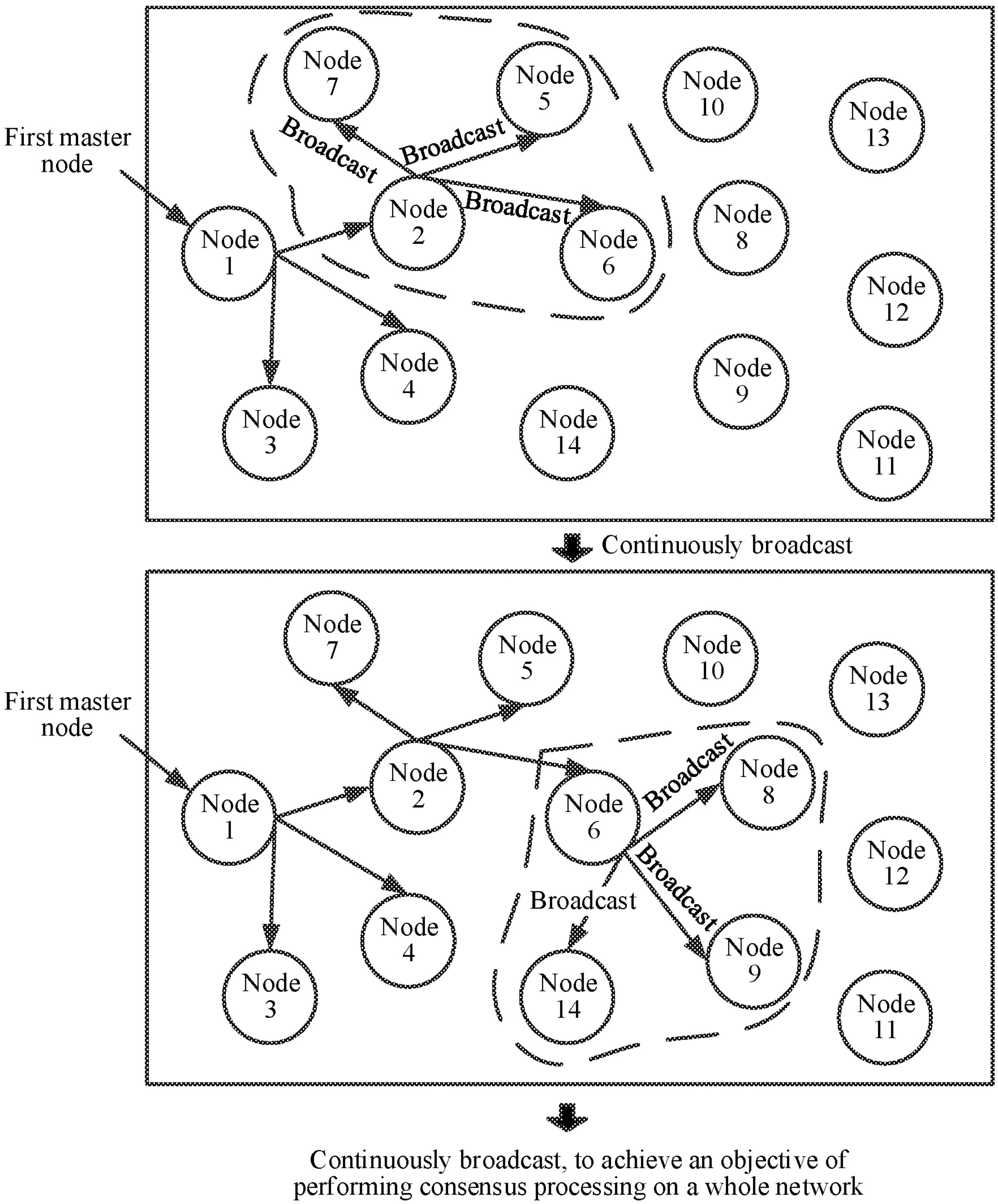

Referring to FIG. 4A and FIG. 4B, FIG. 4A and FIG. 4B are schematic diagrams of scenarios of block broadcast according to this application. As shown in FIG. 4A, consensus nodes in the consensus network may include a node 1 to a node 14. The node 1 may be the first master node. The node 1 may first broadcast, to a corresponding correspond, the first block on which consensus processing needs to be performed, where the consensus sub-network corresponding to the node 1 may include the node 1, the node 2, the node 3, and the node 4, so that each consensus node in the consensus sub-network corresponding to the node 1 may perform consensus processing on the first block, a consensus node in the consensus sub-network that succeeds in consensus processing on the first block may continue to broadcast the first block to a consensus sub-network corresponding to the consensus node, and each consensus node in the consensus sub-network may continue to perform consensus processing on the first block.

As shown in FIG. 4A, when consensus processing on the first block is successful on the node 2, the node 2 may be the second consensus node in this case, and the node 2 may continue to broadcast the first block to a corresponding consensus sub-network (for example, the second consensus sub-network). In this case, the consensus sub-network corresponding to the node 2 may include the node 2, the node 5, the node 6, and the node 7. In this way, each consensus node in the consensus sub-network corresponding to the node 2 may continue to perform consensus processing on the first block, and a consensus node in the consensus sub-network that succeeds in consensus on the first block may further continue to broadcast the first block to a consensus sub-network corresponding to the consensus node, so that each consensus node in the consensus sub-network may still continue to perform consensus processing on the first block.

As shown in FIG. 4B, when consensus processing on the first block is successful on the node 6, the node 6 may be the first consensus node in this case, and the node 6 may continue to broadcast the first block to a corresponding consensus sub-network (for example, the first consensus sub-network). In this case, the consensus sub-network corresponding to the node 6 may include the node 6, the node 8, the node 9, and the node 14. By analogy, a consensus node that is in a consensus sub-network corresponding to the node 6 and that success in consensus on the first block may further continue to broadcast the first block to a consensus sub-network corresponding to the consensus node, so that each consensus node in the consensus sub-network may continue to perform consensus processing on the first block, to finally implement consensus processing on the first block in the whole consensus network.

Each consensus node in the consensus network may broadcast a same block to a corresponding consensus sub-network only once.

Figure 5:
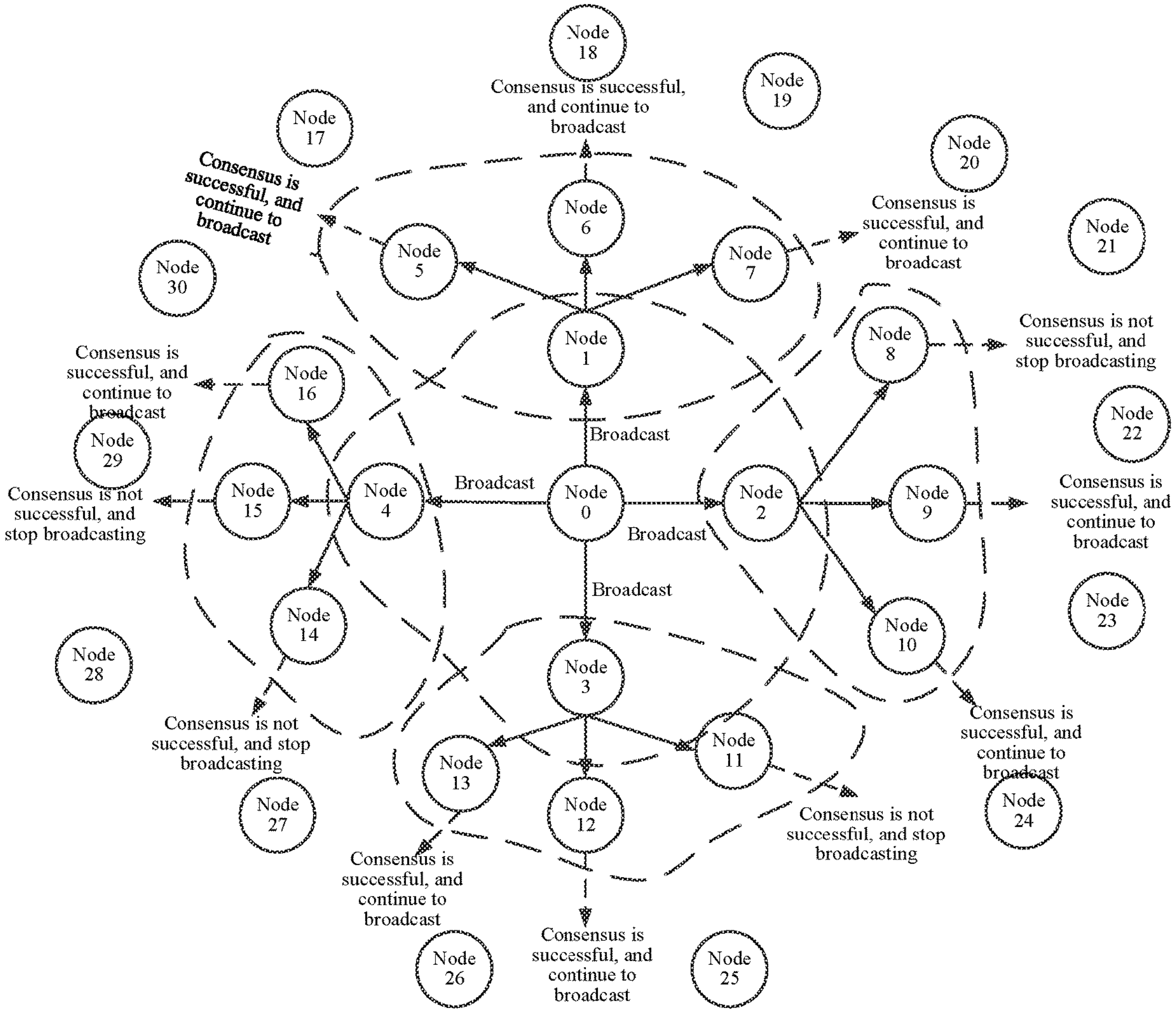
FIG. 5 is a schematic diagram of a scenario of block consensus according to this application.

Referring to FIG. 5, FIG. 5 is a schematic diagram of a scenario of block consensus according to this application. As shown in FIG. 5, N consensus nodes in the consensus network may include a node 0 to a node 30, where the node 0 may be the first master node.

Therefore, the node 0 may first broadcast, in a corresponding consensus sub-network (including the node 0 to the node 4), a first block on which consensus processing needs to be performed, so that consensus processing may be performed on the first block in the consensus sub-network.

When consensus processing is completed on the first block in a consensus sub-network corresponding to the node 0, and all the node 1 to the node 4 succeed in consensus on the first block, all the node 1 to the node 4 may continue to broadcast the first block to respective consensus sub-networks.

For example, in this case, a consensus sub-network corresponding to the node 1 may include the node 1, the node 5, the node 6, and the node 7. Therefore, the node 1 may continue to broadcast the first block to the node 5, the node 6, and the node 7. A consensus sub-network corresponding to the node 2 may include the node 2, the node 8, the node 9, and the node 10. Therefore, the node 2 may continue to broadcast the first block to the node 8, the node 9, and the node 10. A consensus sub-network corresponding to the node 3 may include the node 3, the node 11, the node 12, and the node 13. Therefore, the node 3 may continue to broadcast the first block to the node 11, the node 12, and the node 13. A consensus sub-network corresponding to the node 4 may include the node 4, the node 14, the node 15, and the node 16. Therefore, the node 4 may continue to broadcast the first block to the node 14, the node 15, and the node 16.

By analogy, a consensus node in each consensus sub-network succeeds in consensus on the first block may continue to broadcast the first block to a corresponding consensus sub-network for consensus processing, and may subsequently perform on-chain processing on the first block as long as a quantity of consensus nodes in the consensus network succeed in consensus on the first block is greater than or equal to a quantity threshold. A consensus node in each consensus sub-network fails consensus on the first block does not need to broadcast the first block to more consensus nodes.

S103: Broadcast the consensus success result of the first consensus node for the first block in the consensus network, obtain a first quantity of consensus success results for the first block in the consensus network, and perform on-chain processing on the first block based on the first quantity.

In a possible implementation, the first consensus node may broadcast a consensus success result of the first consensus node for the first block in the consensus network, so that another consensus node in the consensus network may also obtain the consensus success result of the first consensus node for the first block. However, when consensus on the first block is not successful on the first consensus node, the first consensus node does not need to broadcast a consensus failure result of the first consensus node for the first block.

Similarly, in the consensus network, the first consensus node may first broadcast the consensus success result of the first consensus node for the first block to a corresponding consensus sub-network based on the gossip protocol, and then a consensus node in the consensus sub-network corresponding to the first consensus node continues to broadcast the consensus success result of the first consensus node for the first block to a corresponding consensus sub-network. By analogy, broadcast is continuously performed, and finally the consensus success result of the first consensus node for the first block is broadcast in the whole consensus network.

Actually, each consensus node in the consensus network that succeeds in consensus on the first block may respectively broadcast a consensus success result of the consensus node for the first block in the consensus network based on a principle in which the first consensus node broadcast the consensus success result of the first consensus node for the first block in the consensus network. Therefore, each consensus node in the consensus network may obtain a consensus success result of another consensus node for the first block.

In this way, the first consensus node may further obtain a quantity (which may be referred to as a first quantity) of consensus success results for the first block in the consensus network. The first quantity may be a total quantity of consensus success results of consensus nodes for the first block that are obtained by the first consensus node in the whole consensus network.

Further, the first consensus node may perform on-chain processing on the first block based on the first quantity. When the first quantity is greater than or equal to the quantity threshold, it indicates that consensus on the first block is successful in the whole consensus network, and the first consensus node may perform on-chain processing on the first block, that is, add the first block to a blockchain network. However, when the first quantity is less than the quantity threshold, it indicates that consensus on the first block is not successful in the whole consensus network, and the first consensus node may discard the first block, that is, skip performing on-chain processing on the first block.

The quantity threshold may be set based on actual requirements. In a possible implementation, the quantity threshold may be set based on a maximum quantity of malicious nodes supported in the consensus network, for example, the quantity threshold may be 2 f+1, where f is the maximum quantity of malicious nodes supported in the consensus network (that is, a maximum quantity of malicious consensus nodes that can be accepted). In this case, N is also related to the maximum quantity of malicious nodes supported in the consensus network, for example, N needs to be greater than or equal to 3 f+1.

In a possible implementation, a consensus success result of any consensus node in the consensus network for a block may be a node signature of the any consensus node for the block. The first consensus node may cache a node signature set associated with the first block. The node signature set is used for storing a node signature (that is, the consensus success result) of each consensus node in the consensus network for the first block. When consensus on the first block is successful on the first consensus node, the node signature set may include a node signature of the first consensus node for the first block.

Therefore, in a process of performing consensus processing on the first block in the consensus network (that is, a process of performing consensus processing on the first block in each consensus sub-network of the consensus network), the first consensus node may receive node signatures broadcast by third remaining consensus nodes for the first block (where a node signature of the consensus node for the first block may be broadcast, or a received node signature of another consensus node for the first block may be broadcast), and the first consensus node may add all received node signatures for the first block to the node signature set associated with the first block. The third remaining consensus nodes are consensus nodes in the N consensus nodes other than the first consensus node.

Further, the first consensus node may obtain a quantity of node signatures in the node signature set associated with the first block, where the quantity may be the first quantity. In this way, when the first quantity is greater than or equal to the quantity threshold, the first consensus node may perform on-chain processing on the first block (that is, storage, for example, adding to a local account book of the first consensus node).

According to a principle of performing on-chain processing on the first block by the first consensus node, each consensus node in the consensus network may perform on-chain processing on the first block based on a received consensus success result for the first block.

Figure 6:
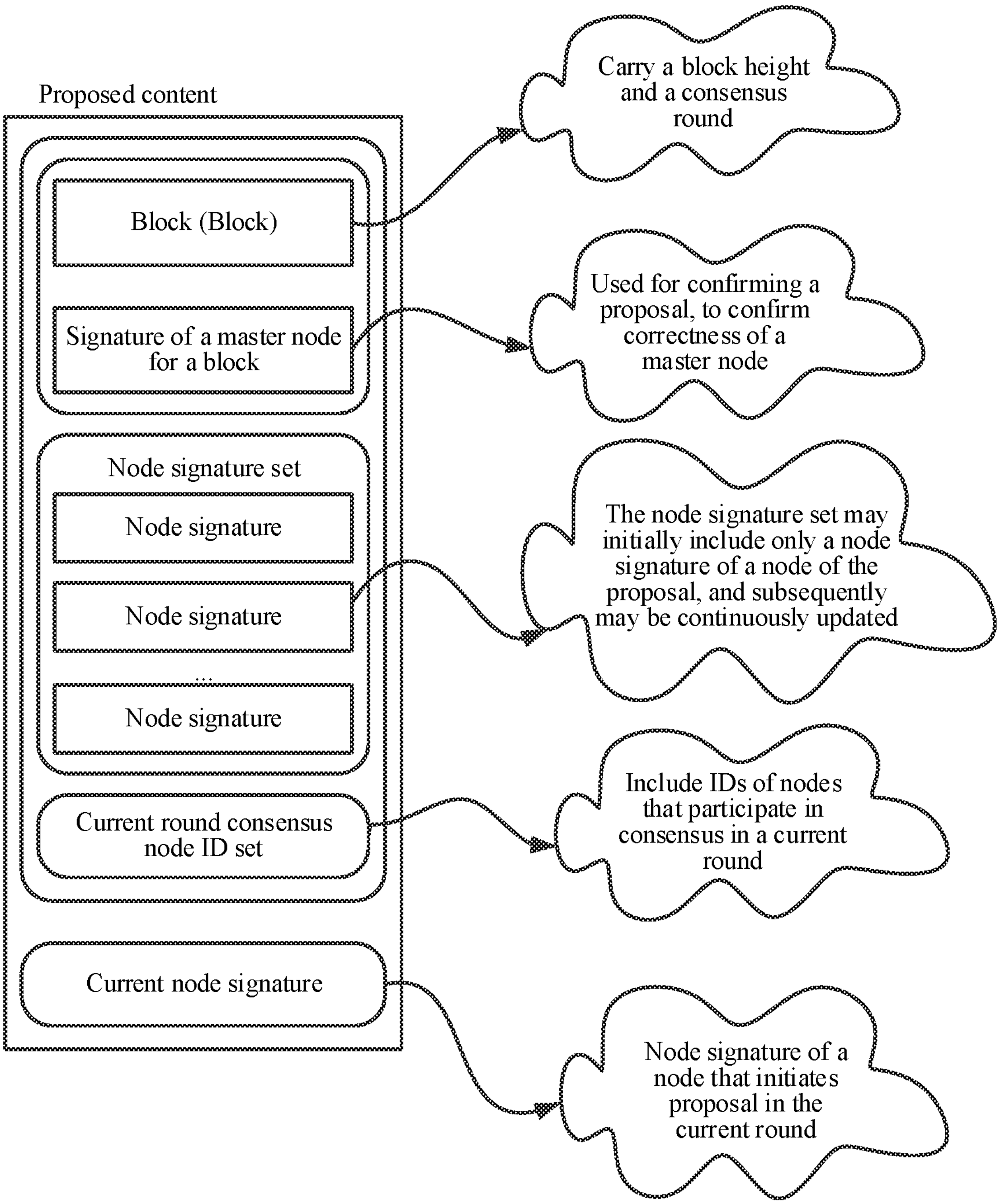
FIG. 6 is a schematic diagram of a scenario of block proposal content according to this application.

Referring to FIG. 6, FIG. 6 is a schematic diagram of a scenario of block proposal content according to this application. As shown in FIG. 6, content (that is, broadcast content) proposed by any consensus node in a corresponding consensus sub-network may include a block (for example, a first block), a signature of a master node for the block (for example, a signature of a first master node for the first block), a node signature set, a current round consensus node identifier (ID) set (where the set may include node IDs of all consensus nodes in a current consensus sub-network), and a current node signature (that is, a node signature of a "master node" in the current consensus sub-network for a block).

The block in the proposed content may carry a block height corresponding to the block and a consensus round, where the block height and the consensus round may be used to uniquely identify the block. The signature of a master node (for example, the first master node, where the master node represents a master node in the whole consensus network) for the block in the proposed content may be used for confirming the proposed content, that is, confirming that consensus processing on a current block is initiated by a current master node.

The node signature set in the proposed content may be used for recording a node signature of each consensus node in the consensus network for the first block, where the node signature is a consensus success result for the first block. It may be understood that, the "master node" (where the "master node" is used for representing a consensus node plays a role of the master node in a corresponding consensus sub-network) in the consensus sub-network initially broadcast the proposed content to the corresponding consensus sub-network. The node signature set initially may include a node signature of the "master node" for the first block, and the node signature set may be continuously updated subsequently.

The current round consensus node ID set in the proposed content may be used for enabling each consensus node in the current consensus sub-network to clearly know which consensus nodes need to complete consensus processing on the block together.

The current node signature is used for confirming that the current proposed content is broadcast by the consensus node used as the "master node" in the current consensus sub-network.

Moreover, when the second consensus node is the first master node, the K consensus nodes may include the second master node. The second master node may be a next master node in the N consensus nodes that is configured to perform master node rotation on the first master node, that is, the second master node may be a next master node after the first master node for block proposal.

Therefore, after determining that a consensus result of the second consensus node for the first block is a consensus success result, the second master node initiates a consensus process for a second block in the consensus network. A principle of initiating the consensus process for the second block by the second master node is the same as the principle of initiating the consensus process for the first block by the first master node, for example, first broadcasting to a corresponding consensus sub-network, and then continuously broadcasting and performing consensus processing between consensus sub-networks of the consensus network. A block height corresponding to the second block may be a next block height of the block height corresponding to the first block.

A block height corresponding to a block on which consensus processing needs to be performed is a block height of the block on which on-chain processing is performed after consensus on the block is successful in the whole consensus network.

As can be seen from the above, when initiating a proposal for a block, a current master node in the consensus network may preferentially broadcast the block to a next master node (that is, a consensus sub-network corresponding to the current master node may include a next master node of the current master node), so that the next master node may initiate a consensus process for a next block (for example, the second block) in advance after the next master node completes consensus processing on the block broadcast by the current master node. In this way, the consensus process for the next block and a consensus process for the current block may be synchronously performed, to improve efficiency of consensus processing on the block.

In this application, the consensus network includes N consensus nodes. A first master node in the consensus network may initiate a consensus process for a first block. In the consensus process for the first block, a first consensus node may receive the first block broadcast by a second consensus node in a second consensus sub-network. The second consensus sub-network includes K consensus nodes in the N consensus nodes, both the first consensus node and the second consensus node belong to the second consensus sub-network, and the second consensus node is any one of the N consensus nodes other than the first consensus node, K being a positive integer less than N. In other words, compared with the consensus network, the second consensus sub-network is a small-scale network. Consensus processing is performed on the first block in the second consensus sub-network to obtain a consensus result of the first consensus node for the first block. When it is determined that the consensus result of the first consensus node for the first block is a consensus success result, the first block is broadcast in a first consensus sub-network to which the first consensus node belongs, to continue to perform consensus processing on the first block in the first consensus sub-network. The first consensus sub-network includes M consensus nodes in the N consensus nodes, M being a positive integer less than N. In other words, compared with the consensus network, the first consensus sub-network is also a small-scale network. In this way, consensus in the large-scale consensus network is converted into consensus in several small-scale consensus sub-networks. The consensus success result of the first consensus node for the first block is broadcast in the consensus network, a first quantity of consensus success results for the first block in the consensus network is obtained, and on-chain processing is performed on the first block based on the first quantity. Therefore, in the method provided in this application, each consensus node can broadcast a block in a small network (for example, the first consensus sub-network and the second consensus sub-network) of the consensus network, to further perform consensus processing on the block in the small network, which can reduce a communication volume during consensus processing on the block, and improve efficiency and performance for consensus on the block in the consensus network.

Figure 7:
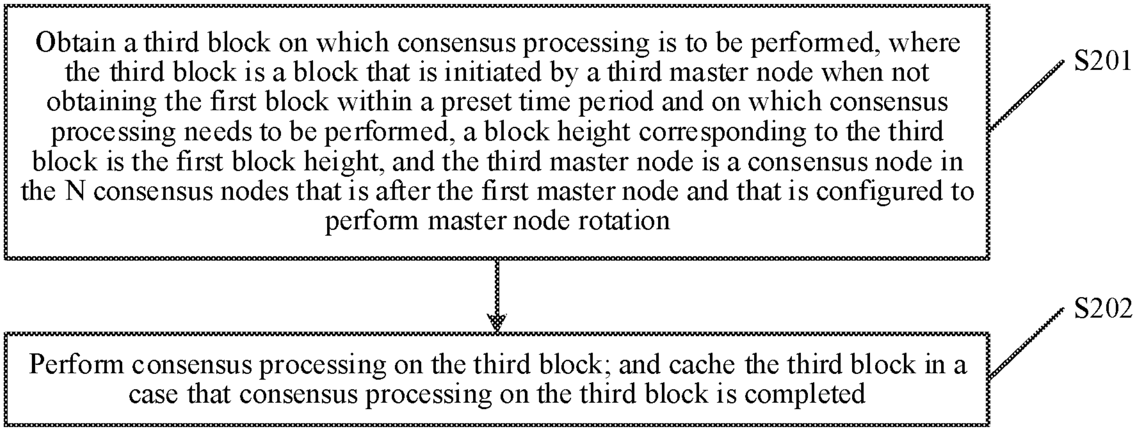
FIG. 7 is a schematic flowchart of a block processing method according to this application.

Referring to FIG. 7, FIG. 7 is a schematic flowchart of a block processing method according to this application. As shown in FIG. 7, the method includes the following steps:

S201: Obtain a third block on which consensus processing is to be performed, where the third block is a block that is initiated by a third master node when not obtaining the first block within a preset time period and on which consensus processing needs to be performed, a block height corresponding to the third block is a first block height, and the third master node is a consensus node in the N consensus nodes that is after the first master node and that is configured to perform master node rotation.

In a possible implementation, an execution entity of this embodiment of this application may alternatively be the first consensus node. The block height corresponding to the first block may be the first block height, that is, the first block is a block proposed at the first block height. When consensus on the first block is successful (for example, a quantity of consensus success results for the first block in the consensus network is greater than or equal to the quantity threshold) in the whole network (for example, the whole consensus network), a block height of the first block on which on-chain processing is performed is the first block height.

The preset time period may be a time period set based on an actual requirement, and may be used as a time limit for the third master node to wait to receive the first block. When the third master node does not receive the first block within the preset time period, it may be determined that waiting times out, and in this case, the third master node may initiate the third block on which consensus processing is to be performed. There may be many reasons for which the third master node does not receive the first block within the preset time period, for example, transmission delay, a network failure, or the like.

The first consensus node may obtain a third block on which consensus processing is to be performed. The third block may be a block, on which consensus processing needs to be performed, that is initiated by the third master node when not obtaining the first block after timeout. Alternatively, the third block may be a block, on which consensus processing needs to be performed, that is generated by the third master node when not obtaining (not obtaining due to transmission delay, a network failure, or the like) the block proposed at the first block height after timeout. A block height corresponding to the third block may also be the first block height, that is, the block height corresponding to the first block may be the same as the block height corresponding to the third block.

In other words, one or more rounds of consensus processing on a block may be initiated at a same block height. One round of consensus processing corresponds to one block on which consensus processing needs to be performed. However, for the same block height, consensus processing may be successful in the whole network only on one block in a round, that is, at the same block height, consensus processing is successful in the whole network only on one block. The first block and the third block may be blocks corresponding to a same block height but different consensus rounds.

The third master node may be a consensus node in the N consensus nodes that is after the first master node and that is configured to perform master node rotation. For example, the third master node may be the $1^{st}$ master node (for example, the second master node) after the first master node, or the third master node may alternatively be the $2^{nd}$ master node after the first master node, or the third master node may alternatively be the $3^{rd}$ master node after the first master node, or the like.

The third block obtained by the first consensus node may be broadcast by the third master node. Alternatively, the third block obtained by the first consensus node may not be broadcast by the third master node, but is broadcast by another consensus node that has received the third block initiated by the first consensus node. A principle of broadcasting and performing consensus processing on the third block by the third master node in the consensus network may be the same as the principle of broadcasting and performing consensus processing on the first block by the first master node in the consensus network, for example, continuously broadcasting and performing consensus processing between consensus sub-networks.

S202: Perform consensus processing on the third block; and cache the third block when consensus processing on the third block is completed.

In a possible implementation, the first consensus node may perform consensus processing on the received third block, and may first cache the third block when consensus processing on the second block is completed, to further continue to obtain a consensus success result of another consensus node for the third block in the consensus network. In addition, after completing consensus processing on the third block, the first consensus node may obtain a consensus result for the third block, where the consensus result may be a consensus success result or a consensus failure result. In other words, after the first consensus node completes consensus processing on the third block, regardless of whether the first consensus node succeeds in consensus processing on the third block, the first consensus node may first cache the third block, to continue to obtain a consensus success result of another consensus node for the third block in the consensus network, thereby flexibly processing the first block based on an actual situation. Generally, at a block height, one consensus node can succeed in consensus only on one block, that is, one consensus node can cast an agreement vote (that is, consensus succeeds, and in other words, a consensus success result is obtained) only for a block in any one of several rounds of consensus processing at the same block height. In addition, generally, after casting an agreement vote for a block, one consensus node cannot subsequently cast an opposition vote (that is, consensus fails, and in other words, a consensus failure result is obtained) for the block. However, in a special case, after one consensus node casts an opposition vote for a block, when a quantity of consensus success results for the block in the consensus network, and the quantity is greater than or equal to the quantity threshold, it indicates that consensus on the block is successful in the whole consensus network, and the consensus node may change the opposition vote for the block into an agreement vote.

Similarly, after the first consensus node completes consensus processing on the first block, regardless of whether obtaining a consensus success result for the first block or obtaining a consensus failure result for the first block, the first consensus node may also cache the first block, to further continue to obtain a consensus success result of another consensus node for the first block in the consensus network, thereby flexibly processing the first block based on an actual situation.

In the foregoing case, the first consensus node may also obtain a quantity (which may also be referred to as a second quantity) of consensus success results for the third block in the consensus network. When the second quantity is greater than or equal to the quantity threshold, it indicates that consensus on the third block is successful in the whole consensus network. In this case, the first consensus node may perform on-chain processing on the third block, and may delete the first block. At a same block height, there may be only one block on which consensus processing is successful. In other words, in several rounds of consensus at the same block height, a quantity of consensus success results for only a block in one round in the consensus network is greater than or equal to the quantity threshold.

Therefore, when the second quantity of consensus success results for the third block in the consensus network is greater than or equal to the quantity threshold, the first quantity of consensus success results for the first block in the consensus network is inevitably not greater than or equal to the quantity threshold. In other words, after consensus on the third block is successful (that is, consensus succeeds) in the whole consensus network, consensus on the first block is not successful in the whole consensus network, so that correctness of block consensus is ensured.

Similarly, when the first quantity is greater than or equal to the quantity threshold, the second quantity may not be greater than or equal to the quantity threshold. In this case, consensus on the first block is successful in the whole consensus network, and the first consensus node may perform on-chain processing on the first block, and may delete the cached third block.

In addition, in this application, since proposal consensus may be performed on a plurality of blocks at a same block height, that is, the first consensus node may cache a plurality of blocks at the same block height, and block heights corresponding to the plurality of blocks are the same. Therefore, the following describes a process of how to determine, when a block of a next block height is obtained, a parent block of the block of the next block height from the cached plurality of blocks.

In this application, a block weight may be added for each cached block, and subsequently, a parent block of each block is selected based on the block weight. A larger block weight indicates that a corresponding block is more reliable at a current block height, and a smaller block weight indicates that the corresponding block is less reliable at the current block height. Descriptions are provided below by using the first block and the third block as an example. When there may be more blocks at the same block height, processing logic between each two blocks is similar, as described below.

The first consensus node may obtain a block weight of the first block based on a quantity of child blocks of the cached first block. In a possible implementation, the block weight of the first block may be equal to the quantity of child blocks of the first block cached by the first consensus node.

Similarly, the first consensus node may further obtain a block weight of the third block based on a quantity of child blocks of the cached third block. In a possible implementation, the block weight of the third block may be equal to the quantity of child blocks of the third block cached by the first consensus node. The block weight of the first block and the block weight of the third block are used for determining a parent block of a fourth block, a block height corresponding to the fourth block is a second block height, and the second block height is a next block height of the first block height.

A child block of a block may include a block a that uses the block as a parent block, a block b that uses the block a as a parent block, a block c that uses the block b as a parent block, a block d that uses the block c as a parent block, . . . In other words, a child block of a block may include all blocks that can be traced upward (i.e., traced backed) to a parent block and can be traced back to the block.

A same-level block of a block may refer to a block whose block heights are the same as a block height corresponding to the block. Since both the first block and the third block correspond to the first block height, the first block and the third block are same-level blocks of each other.

As can be seen from the above, when a block weight of a block becomes larger, it indicates that consensus processing is performed on more subsequent blocks based on the block; or otherwise, when a block weight of a block becomes smaller, it indicates that consensus processing is performed on fewer subsequent blocks based on the block. Therefore, a larger block weight indicates that a corresponding block is more reliable at a current block height.

Further, the first consensus node may obtain a fourth block on which consensus processing needs to be performed. A block height corresponding to the fourth block may be referred to as a second block height, and the second block height may be a next block height of the first block height. For example, the first block height is 99, and the second block height may be 100. In a possible implementation, the fourth block may be the second block, or may be a same-level block of the second block.

Therefore, when cached blocks corresponding to the first block height only include the first block and the third block, and the block weight of the first block is greater than the block weight of the third block, the first consensus node may use the first block as the parent block of the fourth block, and perform consensus processing on the fourth block.

However, when cached blocks corresponding to the first block height only include the first block and the third block, and the block weight of the first block is less than the block weight of the third block, the first consensus node may use the third block as the parent block of the fourth block, and perform consensus processing on the fourth block.

When the cached blocks corresponding to the first block height only include the first block and the third block, and the block weight of the first block is equal to the block weight of the third block, the first consensus node may randomly select one block from the first block and the third block as the parent block of the fourth block, and perform consensus processing on the fourth block.

Similarly, when the first consensus node completes consensus processing on the fourth block and obtains a consensus result (which may be a consensus success result or a consensus failure result) for the fourth block, the first consensus node may also cache the fourth block.

The first consensus node may also obtain a quantity of consensus success results for the fourth block in the consensus network. It may be understood that, when consensus processing on one block is successful in the consensus network, consensus processing on all parent blocks to which the block can be traced back may be successful. Therefore, when the quantity of consensus success results for the fourth block in the consensus network is greater than or equal to the quantity threshold, and the parent block of the fourth block is the first block, it indicates that consensus processing on the fourth block and the first block may be successful in the whole consensus network, and the first consensus node may delete the cached third block and a same-level block of the fourth block, and perform on-chain processing on the cached first block and the fourth block.

In a case that, due to network delay, a quantity of fourth blocks obtained by the first consensus node in the consensus network is greater than or equal to the quantity threshold of consensus success results, but a quantity of first blocks that are not obtained in the consensus network is greater than or equal to the quantity threshold of consensus success results, the first consensus node may wait until the quantity of first blocks obtained in the consensus network is greater than or equal to the quantity threshold of consensus success results, to perform on-chain processing on the first block and the fourth block.

Similarly, when it is determined that the quantity of consensus success results for the fourth block in the consensus network is greater than or equal to the quantity threshold, and the parent block of the fourth block is the third block, it indicates that consensus processing on the fourth block and the third block is successful in the whole consensus network, and the first consensus node may delete the cached first block and the same-level block of the fourth block, and perform on-chain processing on the cached third block and the fourth block.

In other words, when consensus processing on a cached block is successful in the whole consensus network, on-chain processing may be performed on the block and all parent blocks to which the block can be traced back (that is, traced upward, for example, blocks whose block heights are less than a block height corresponding to the block), a same-level block of the block may be deleted, and same-level blocks of all the parent blocks to which the block can be traced back.

In addition, after determining the parent block of the fourth block, completing consensus processing on the fourth block, and caching the fourth block, the first consensus node may further update the block weight of the first block, the block weight of the third block, and a block weight of the fourth block based on the cached fourth block and the parent block of the fourth block.

For example, when the parent block of the fourth block is the first block, the updating the block weight of the first block may be adding 1 to an existing block weight of the first block; and when the parent block of the fourth block is the third block, the updating the block weight of the third block may be adding 1 to an existing block weight of the third block, and a block weight added to a latest cached fourth block may be equal to 0.

Figure 8:
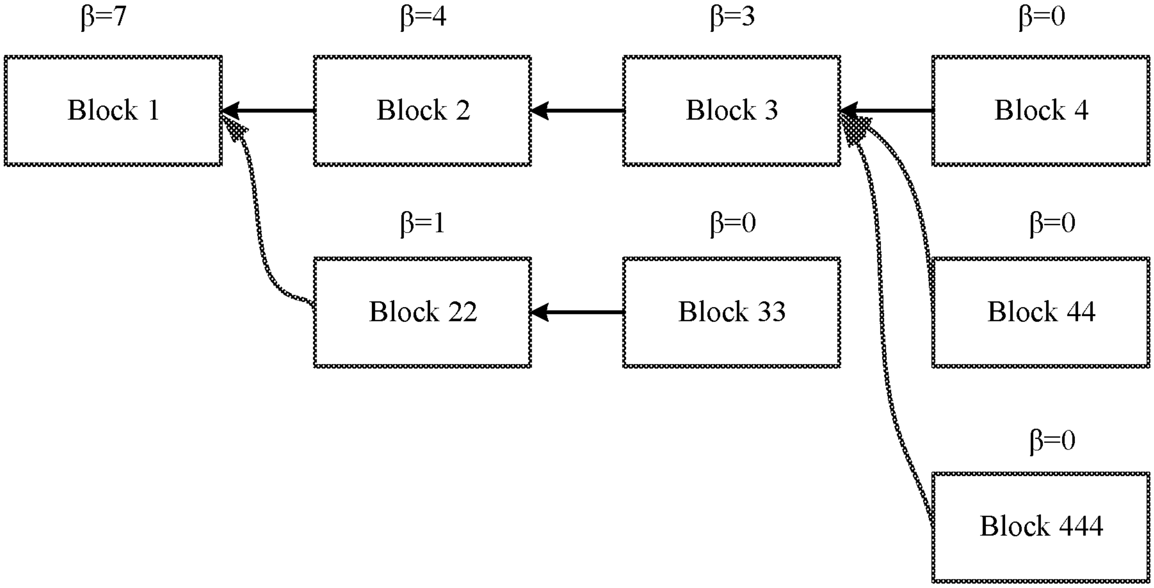
FIG. 8 is a schematic diagram of a scenario of setting a block weight according to this application.

Referring to FIG. 8, FIG. 8 is a schematic diagram of a scenario of setting a block weight according to this application. As shown in FIG. 8, the first consensus node may cache a block 1, a block 2, a block 22, a block 3, a block 33, a block 4, a block 44, and a block 444.

The block 2 and the block 22 are same-level blocks. A block height corresponding to the block 2 is the same as a block height corresponding to the block 22. The block 2 and the block 22 are blocks on which proposal consensus are performed at a same block height, and consensus processing may be performed on the block 2 and the block 22 by different consensus nodes.

Similarly, the block 3 and the block 33 are same-level blocks. A block height corresponding to the block 3 is the same as a block height corresponding to the block 33. The block 3 and the block 33 are blocks on which proposal consensus are performed at a same block height, and consensus processing may be performed on the block 3 and the block 33 by different consensus nodes.

In addition, the block 4, the block 44, and the block 444 are same-level blocks. A block height corresponding to the block 4, a block height corresponding to the block 44, and a block height corresponding to the block 444 are the same. The block 4, the block 44, and the block 444 may be blocks on which proposal consensus is performed in different rounds at the same block height, and consensus processing may be performed on the block 4, the block 44, and the block 444 by different consensus nodes.

Another block pointed by an arrow of a block may be a parent block of the block. In this case, a parent block of both the block 2 and the block 22 is the block 1, a parent block of the block 3 is the block 2, a parent block of the block 33 is the block 22, and a parent block of the block 4, the block 44, and the block 444 is the block 3.

The block weight may be denoted as P. Child blocks of the block 1 may include 7 child blocks, namely, the block 2, the block 22, the block 3, the block 33, the block 4, the block 44, and the block 444. Therefore, a block weight of the block 1 is 7. Child blocks of the block 2 may include 4 child blocks, namely, the block 3, the block 4, the block 44, and the block 444. Therefore, a block weight of the block 2 is 4. Child blocks of the block 22 may include one child block, namely, the block 33. Therefore, a block weight of the block 22 is 1. Child blocks of the block 3 may include 3 child blocks, namely, the block 4, the block 44, and the block 444. Therefore, a block weight of the block 3 is 3. The block 33 is not followed by a child block, and therefore, a block weight of the block 33 is 0. Similarly, the block 4, the block 44, and the block 444 are not followed by child blocks, and therefore, block weights of the block 4, the block 44, and the block 444 are 0.

When a block x whose block height is the same as block heights corresponding to the block 3 and the block 33 needs to be added in this case, the block 2 may be used as a parent block of the block x. This is because the block weight of the block 2, namely, 4 is greater than the block weight of the block 22, namely, 1.

Figure 9:
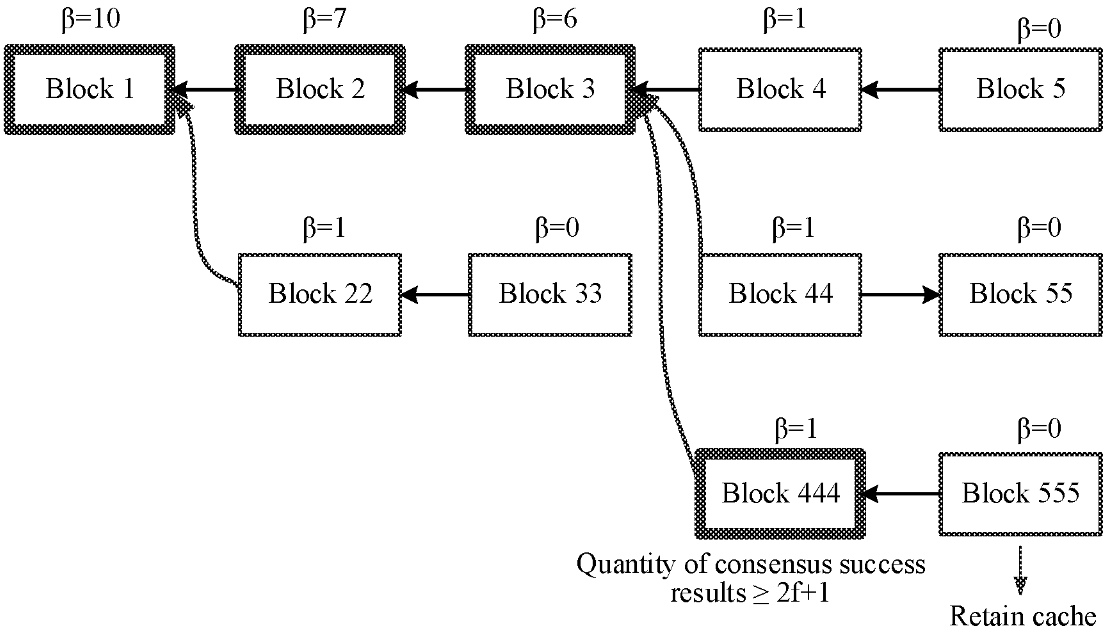
FIG. 9 is a schematic diagram of a scenario of block processing according to this application.

Referring to FIG. 9, FIG. 9 is a schematic diagram of a scenario of block processing according to this application. As shown in FIG. 9, in this case, the first consensus node may currently cache a block 1, a block 2, a block 22, a block 3, a block 33, a block 4, a block 44, a block 444, a block 5, a block 55, and a block 555. The block 2 and the block 22 may be same-level blocks of each other, the block 3 and the block 33 may be same-level blocks of each other, the block 4, the block 44, and the block 444 may be same-level blocks of each other, and the block 5, the block 55, and the block 555 may be same-level blocks of each other.

When a quantity of consensus success results for the block 444 that are obtained by the first consensus node in the consensus network is greater than or equal to the quantity threshold (that is, 2 f+1), it indicates that consensus on the block 444 is successful in the whole consensus network, so that it may be determined that consensus on all parent blocks (including the block 3, the block 2, and the block 1) to which the block 444 can be traced back is successful in the consensus network. In this way, the first consensus node may delete same-level blocks (including the block 22 and the block 33) of all the parent blocks to which the block can be traced back, delete same-level blocks (including the block 4 and the block 44) of the block 444, and delete child blocks (including the block 5 and the block 55) of the same-level blocks of the block 444. Because a final consensus result for the block 555 in the consensus network is not currently determined, the cached block 555 is retained, that is, continue to cache the block 555.

In this application, a corresponding block weight may be added for each cached block, and subsequently, a parent block of a newly cached block may be accurately located based on the block weight added for each cached block, thereby improving accuracy consensus on the block in the whole network.

Figure 10:
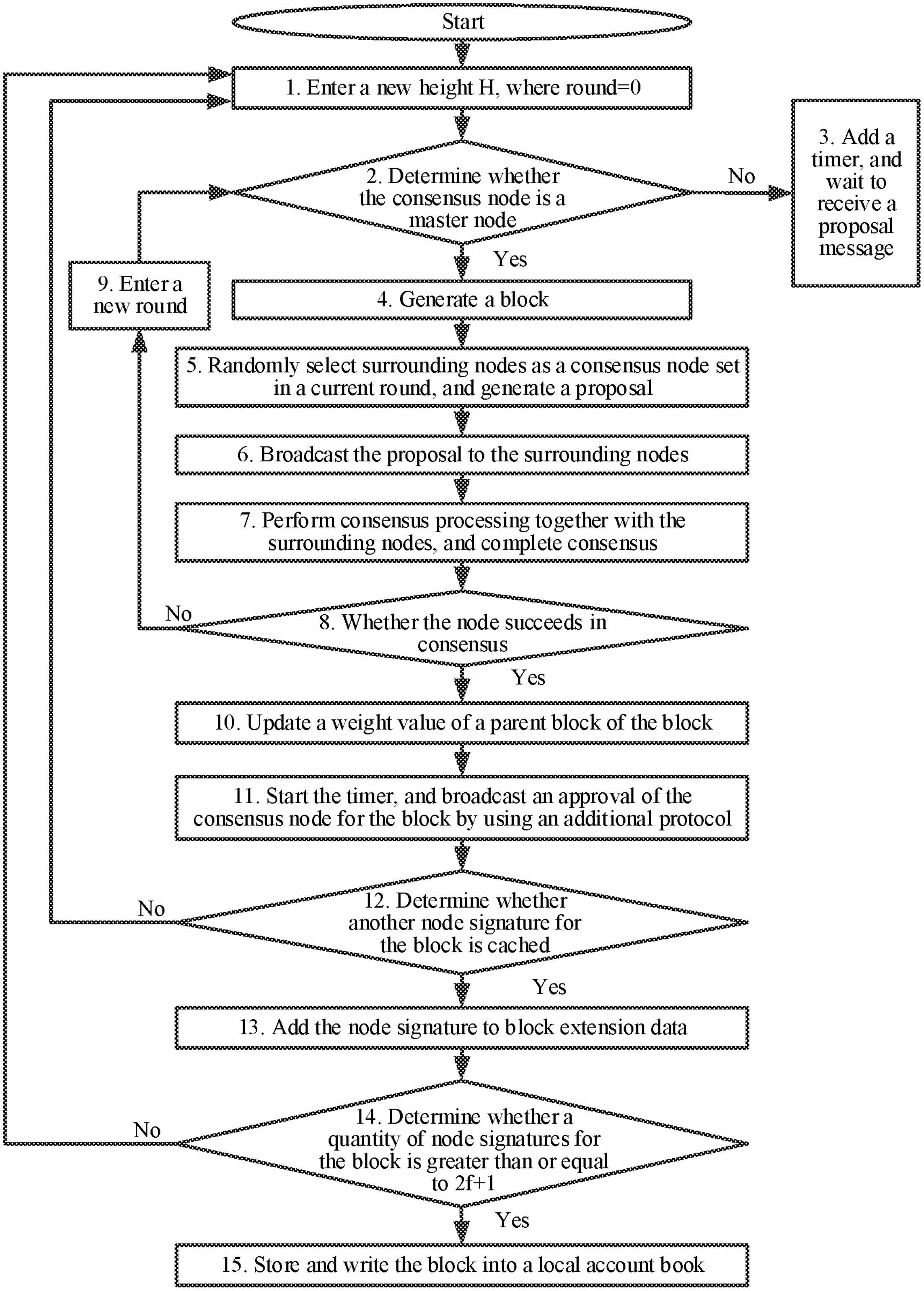
FIG. 10 is a schematic flowchart of block consensus according to this application.

Referring to FIG. 10, FIG. 10 is a schematic flowchart of block consensus according to this application. As shown in FIG. 10, the procedure may be performed by any consensus node.

1. A new block height (for example, a block height H, where H is a positive integer) is entered, and a consensus round is 0 (where the round may be counted from 0, or may be counted from 1).

2. A consensus node determine whether the consensus node is currently a master node, if no, step 3 is performed, or if yes, step 4 is performed.

3. The consensus node may add a timer, and wait to receive a proposal message (where a block, on which consensus processing needs to be performed, in the proposal message may be initiated by a current master node).

4. The consensus node may generate a block on which consensus processing currently needs to be performed.

5. The consensus node may randomly select surrounding nodes as a consensus node set in a current round, where the consensus node set includes consensus nodes in a consensus sub-network corresponding to the consensus node, and generate a proposal (including the generated block).

6. The consensus node broadcast the generated proposal to the selected surrounding nodes.

7. The consensus node and the surrounding nodes may jointly complete consensus processing on a currently proposed block.

8. The consensus node may determine whether the consensus node succeeds in consensus on a block on which consensus processing is currently performed, and perform step 9 if consensus is not successful, or perform step 10 if consensus is successful.

9. The consensus node may enter a new consensus round at a current block height, to further perform step 2 again.

10. The consensus node may cache a current block, and update weight values (that is, block weights) of parent blocks (including all parent blocks to which the block can be traced back) of the block in a memory.

11. The consensus node may start the timer, and broadcasts an approval of the consensus node for the block by using an additional protocol (which is a protocol for performing an additional procedure, where the additional procedure is broadcasting the approval of the consensus node for the block), that is, broadcast a consensus success result of the consensus node for the block.

12. The consensus node may determine whether another node signature for the block is cached, that is, determine whether a node signature (that is, a consensus success result) of another consensus node for the block in the consensus network is obtained, and if yes, step 13 is performed; or if no, it indicates that consensus on the current block is not successful in the whole network, and step 1 is performed again.

13. The consensus node adds obtained node signatures for the block to block extension data, so that the block extension data may include a node signature set associated with the block, and the adding the node signatures for the block to the block extension data is to add all the node signatures for the block to the node signature set associated with the block.

14. The consensus node may determine whether a quantity of node signatures for the block in the block extension data is greater than or equal to 2 f+1, and if yes, step 15 is performed; or if no, it indicates that consensus on the current block is not successful in the whole network, and step 1 is performed again.

15. The consensus node may store the block, that is, write the block into a local account book, that is, perform on-chain processing on the block.

Figure 11:
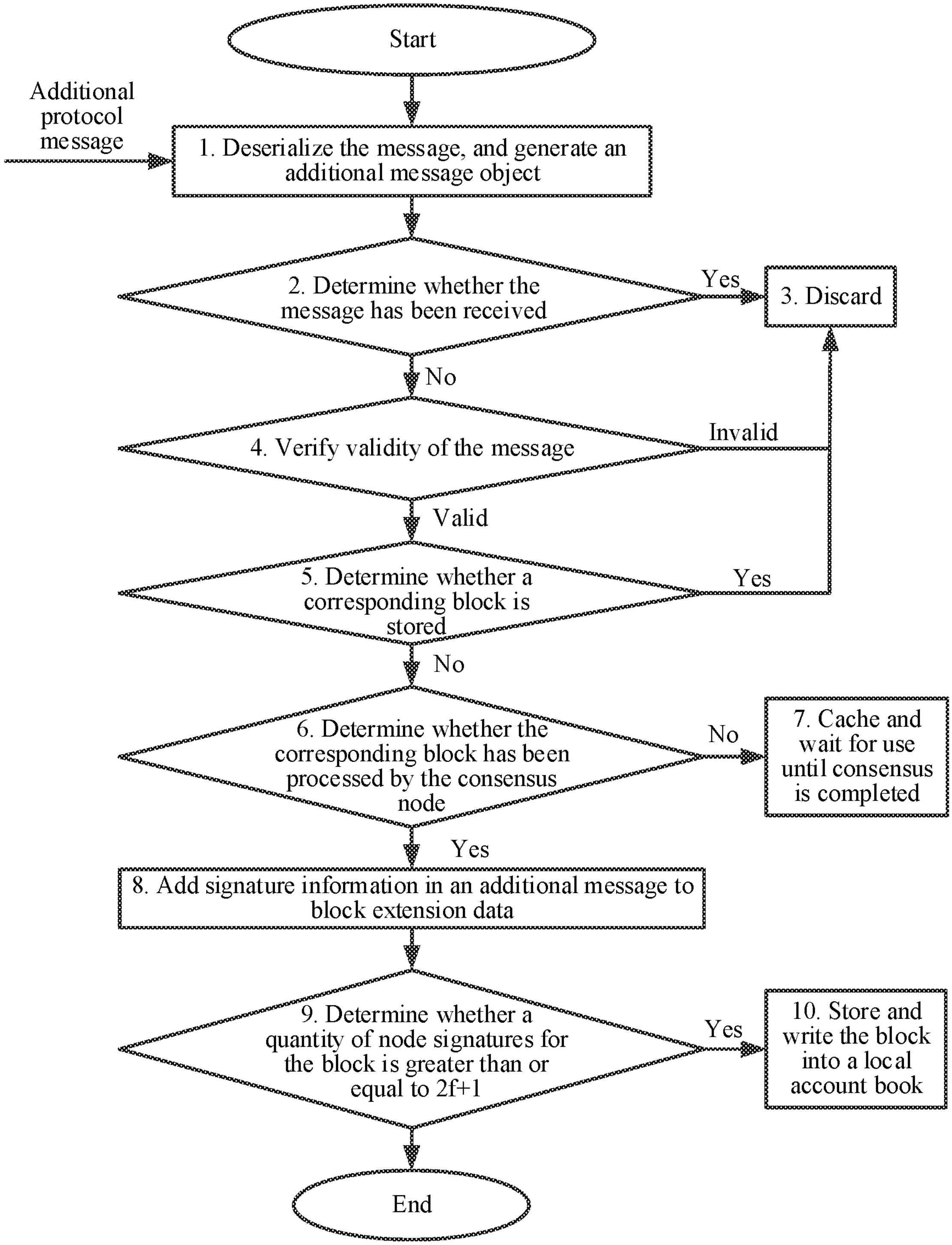
FIG. 11 is a schematic flowchart of an additional method according to this application.

Referring to FIG. 11, FIG. 11 is a schematic flowchart of an additional method according to this application. As shown in FIG. 11, the procedure may be performed by any consensus node.

1. The consensus node may receive a vote message broadcast by another consensus node by using an additional protocol, where the vote message is obtained by serializing consensus success results of another consensus node for a current block (for example, the first block). Therefore, the consensus node may deserialize the vote message to obtain an additional message object, where the additional message object includes a node signature (that is, a consensus success result) of another consensus node for the current block, and the additional message object may carry a node ID of a corresponding consensus node, which indicates that additional message object is obtained by performing consensus processing on the current block by a consensus node to which the node ID belongs.

2. The consensus node may determine whether a currently-obtained additional message object has been received, and if yes, step 3 is performed; or if no, step 4 is performed.

3. The consensus node may discard the currently-obtained additional message object.

4. The consensus node may verify validity of the currently-obtained additional message object, for example, verify whether the additional message object is obtained by signing the current block by a corresponding consensus node by using a private key (where verification may be performed on a public key of the consensus node), and perform step 3 if verification is not successful, or perform step 5 if verification is successful.

5. The consensus node may determine whether a block corresponding to the additional message object is stored (for example, determine whether on-chain processing is performed), and if yes, step 3 is performed; or if no, step 6 is performed.

6. The consensus node may further determine whether the block corresponding to the additional message object has been processed by the consensus node (for example, whether the block is cached after consensus processing is performed), and perform step 7 if not processed, or perform step 8 if processed.

7. The consensus node may first cache the additional message object, and wait for use until subsequent consensus processing on the block corresponding to the additional message object is completed.

8. The consensus node may add a node signature in the additional message object to block extension data of the corresponding block (that is, add to a node signature set associated with the corresponding block).

9. The consensus node may determine whether a quantity of node signatures for the block in the block extension data is greater than or equal to 2 f+1, and if yes, step 10 is performed; or if no, it indicates that consensus on the current block is not successful in the whole network, and processing on the current block is ended.

10. The consensus node may store the block, that is, write the block into a local account book, that is, perform on-chain processing on the block.

Figure 12:
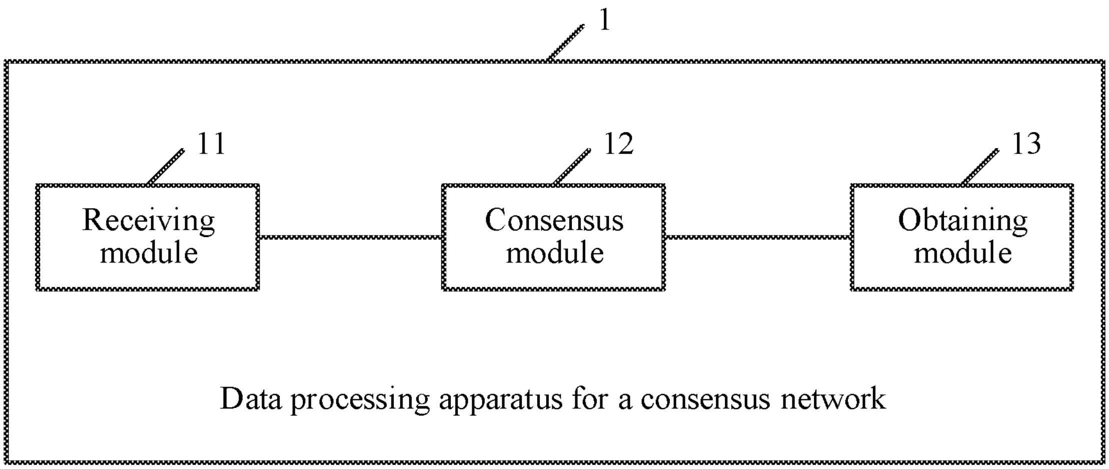
FIG. 12 is a schematic structural diagram of a data processing apparatus for a consensus network according to this application.

Referring to FIG. 12, FIG. 12 is a schematic structural diagram of a data processing apparatus for a consensus network according to this application. The data processing apparatus for a consensus network may be a computer program (including program code) run on a computer device. For example, the data processing apparatus for a consensus network is application software, and the data processing apparatus for a consensus network may be configured to perform the corresponding steps in the method provided in the embodiments of this application. The consensus network includes N consensus nodes, N being a positive integer, and the N consensus nodes include a first master node. The apparatus is used in a first consensus node, and the first consensus node is any one of the N consensus nodes other than the first master node. As shown in FIG. 12, the data processing apparatus 1 for a consensus network may include: a receiving module 11, a consensus module 12, and an obtaining module 13.

The receiving module 11 is configured to receive a first block broadcast by a second consensus node on a second consensus sub-network, the second consensus sub-network including K consensus nodes in the N consensus nodes, and both the first consensus node and the second consensus node belonging to the second consensus sub-network, K being a positive integer less than N; the second consensus node being any one of the N consensus nodes other than the first consensus node; and a consensus process for the first block being initiated by the first master node.

The consensus module 12 is configured to perform consensus processing on the first block in the second consensus sub-network, to obtain a consensus result of the first consensus node for the first block; and in response to determining that the consensus result of the first consensus node for the first block is a consensus success result, broadcast the first block in a first consensus sub-network to which the first consensus node belongs, to continue to perform consensus processing on the first block in the first consensus sub-network, the first consensus sub-network including M consensus nodes in the N consensus nodes, and M being a positive integer less than N.

The obtaining module 13 is configured to broadcast the consensus success result of the first consensus node for the first block in the consensus network, obtain a first quantity of consensus success results for the first block in the consensus network, and perform on-chain processing on the first block based on the first quantity.

In a possible implementation, first remaining consensus nodes in the K consensus nodes are K−1 consensus nodes that are selected by the second consensus node from the N consensus nodes and that are in communication with the second consensus node, and the first remaining consensus nodes are consensus nodes in the K consensus nodes other than the second consensus node; and second remaining consensus nodes in the M consensus nodes are M−1 consensus nodes that are selected by the first consensus node from the N consensus nodes and that are in communication with the first consensus node, and the second remaining consensus nodes are consensus nodes in the M consensus nodes other than the first consensus node.

When the second consensus node is the first master node, the first block broadcast by the second consensus node is generated by the second consensus node; and when the second consensus node is not the first master node, the first block broadcast by the second consensus node is broadcast by a third consensus node in the N consensus nodes to the second consensus node, where the third consensus node is any consensus node in the N consensus nodes other than the first consensus node and the second consensus node.

In a possible implementation, a consensus success result of any consensus node in the consensus network for a block is a node signature of the any consensus node for the block, the first block has an associated node signature set, and the node signature set includes a node signature of the first consensus node for the first block; and a manner for the obtaining module 13 to obtain a first quantity of consensus success results for the first block in the consensus network, and perform on-chain processing on the first block based on the first quantity includes:

in a process in which consensus processing is performed on the first block in the consensus network, receiving node signatures broadcast by third remaining consensus nodes for the first block, and adding the received node signatures to the node signature set, where the third remaining consensus nodes are consensus nodes in the N consensus nodes other than the first consensus node; and obtaining the first quantity of node signatures in the node signature set, and performing on-chain processing on the first block when the first quantity is greater than or equal to a quantity threshold.

In a possible implementation, the K consensus nodes includes a second master node when the second consensus node is the first master node, where the second master node is a next master node that is in the N consensus nodes and that is configured to perform master node rotation on the first master node; and the second master node is configured to initiate a consensus process for a second block in the consensus network after determining that a consensus result of the second consensus node for the first block is a consensus success result, and a block height corresponding to the second block is a next block height of a block height corresponding to the first block.

In a possible implementation, a block height corresponding to the first block is a first block height; and the apparatus 1 is further configured to:

obtain a third block on which consensus processing is to be performed, where the third block is a block that is initiated by a third master node when not obtaining the first block within a preset time period and on which consensus processing needs to be performed, a block height corresponding to the third block is the first block height, and the third master node is a consensus node in the N consensus nodes that is after the first master node and that is configured to perform master node rotation;

perform consensus processing on the third block; and cache the third block when consensus processing on the third block is completed.

In a possible implementation, the apparatus 1 is further configured to:

cache the first block when consensus processing on the first block is completed; and the apparatus 1 is further configured to:

when a second quantity of consensus success results for the third block in the consensus network is obtained, and the second quantity is greater than or equal to a quantity threshold, perform on-chain processing on the third block, and delete the cached first block.

In a possible implementation, the manner for the obtaining module 13 to perform on-chain processing on the first block based on the first quantity includes:

when the first quantity is greater than or equal to the quantity threshold, performing on-chain processing on the first block, and deleting the cached third block.

In a possible implementation, the apparatus 1 is further configured to:

determine a block weight of the first block based on a quantity of child blocks of the cached first block; and determine a block weight of the third block based on a quantity of child blocks of the cached third block, where a same-level block of a block is a block whose corresponding block height is the same as a block height corresponding to the block, and the first block and the third block are same-level blocks of each other; and the block weight of the first block and the block weight of the third block are used for determining a parent block of a fourth block, a block height corresponding to the fourth block is a second block height, and the second block height is a next block height of the first block height.

In a possible implementation, the apparatus 1 is further configured to:

obtain the fourth block on which consensus processing is to be performed;

when the block weight of the first block is greater than the block weight of the third block, use the first block as the parent block of the fourth block, and perform consensus processing on the fourth block; and when the block weight of the first block is less than the block weight of the third block, use the third block as the parent block of the fourth block, and perform consensus processing on the fourth block.

In a possible implementation, when it is determined that a quantity of consensus success results for the fourth block in the consensus network is greater than or equal to the quantity threshold, and the parent block of the fourth block is the first block, the cached third block and a same-level block of the fourth block are deleted, and on-chain processing is performed on the first block and the fourth block; and when it is determined that the quantity of consensus success results for the fourth block in the consensus networks is greater than or equal to the quantity threshold, and the parent block of the fourth block is the third block, the cached first block and the same-level block of the fourth block are deleted, and on-chain processing is performed on the third block and the fourth block, where a same-level block of a block is a block whose block height is the same as a block height corresponding to the block, and the first block and the third block are same-level blocks of each other.

In a possible implementation, the apparatus 1 is further configured to:

cache the fourth block when consensus processing on the fourth block is completed; and update the block weight of the first block, the block weight of the third block, and a block weight of the fourth block based on the cached fourth block and the parent block of the fourth block.

According to an embodiment of this application, the steps involved in the data processing method for a consensus network shown in FIG. 3 may be performed by the modules in the data processing apparatus 1 for a consensus network shown in FIG. 12. For example, S101 shown in FIG. 3 may be performed by the receiving module 11 shown in FIG. 12, S102 shown in FIG. 3 may be performed by the consensus module 12 shown in FIG. 12, and S103 shown in FIG. 3 may be performed by the obtaining module 13 shown in FIG. 12.

In this application, the consensus network includes N consensus nodes. A first master node in the consensus network may initiate a consensus process for a first block. In the consensus process for the first block, a first consensus node may receive the first block broadcast by a second consensus node in a second consensus sub-network. The second consensus sub-network includes K consensus nodes in the N consensus nodes, both the first consensus node and the second consensus node belong to the second consensus sub-network, and the second consensus node is any one of the N consensus nodes other than the first consensus node, K being a positive integer less than N. In other words, compared with the consensus network, the second consensus sub-network is a small-scale network. Consensus processing is performed on the first block in the second consensus sub-network to obtain a consensus result of the first consensus node for the first block. When it is determined that the consensus result of the first consensus node for the first block is a consensus success result, the first block is broadcast in a first consensus sub-network to which the first consensus node belongs, to continue to perform consensus processing on the first block in the first consensus sub-network. The first consensus sub-network includes M consensus nodes in the N consensus nodes, M being a positive integer less than N. In other words, compared with the consensus network, the first consensus sub-network is also a small-scale network. In this way, consensus in the large-scale consensus network is converted into consensus in several small-scale consensus sub-networks. The consensus success result of the first consensus node for the first block is broadcast in the consensus network, a first quantity of consensus success results for the first block in the consensus network is obtained, and on-chain processing is performed on the first block based on the first quantity. Therefore, in the method provided in this application, each consensus node can broadcast a block in a small network (for example, the first consensus sub-network and the second consensus sub-network) of the consensus network, to further perform consensus processing on the block in the small network, which can reduce a communication volume during consensus processing on the block, and improve efficiency and performance for consensus on the block in the consensus network.

According to an embodiment of this application, the modules in the data processing apparatus 1 for a consensus network shown in FIG. 12 may be separately or wholly combined into one or several units, or one (or more) of the units herein may be further divided into a plurality of subunits of smaller functions. In this way, the same operations can be implemented without affecting implementation of the technical effects of the embodiments of this application. The foregoing modules are divided based on logical functions. During practical application, a function of one module may alternatively be implemented by a plurality of units, or functions of a plurality of modules are implemented by one unit. In other embodiments of this application, the data processing apparatus 1 for a consensus network may also include other units. During actual application, the functions may also be cooperatively implemented by other units and may be cooperatively implemented by a plurality of units.

According to an embodiment of this application, a computer program (including program code) that can perform the steps in the corresponding method shown in FIG. 3 may be run on a general-purpose computer device, such as a computer, which includes processing elements and storage elements such as a central processing unit (CPU), a random access memory (RAM), and a read-only memory (ROM), to construct the data processing apparatus 1 for a consensus network shown in FIG. 12 and implement the data processing method for a consensus network in the embodiments of this application. The computer program may be recorded on, for example, a computer-readable recording medium, and may be loaded into the foregoing computing device by using the computer-readable recording medium and run on the computing device.

Figure 13:
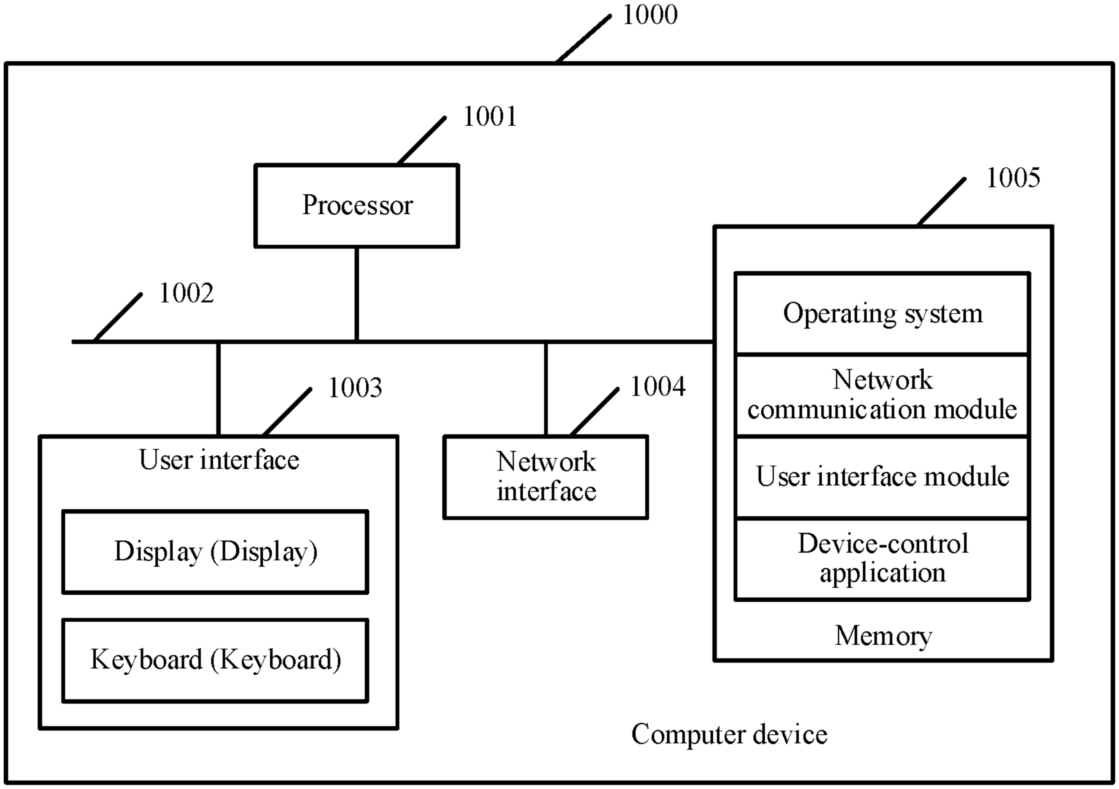
FIG. 13 is a schematic structural diagram of a computer device according to this application.

Referring to FIG. 13, FIG. 13 is a schematic structural diagram of a computer device according to this application. As shown in FIG. 13, the computer device 1000 may include: a processor 1001, a network interface 1004, and a memory 1005. In addition, the computer device 1000 may include: a user interface 1003 and at least one communication bus 1002. The communication bus 1002 is configured to implement connection and communication between these components. The user interface 1003 may include a display and a keyboard. Optionally, the user interface 1003 may further include a standard wired interface and a wireless interface. The network interface 1004 may include a standard wired interface or wireless interface (for example, a Wi-Fi interface). The memory 1005 may be a high-speed RAM, or may be a non-volatile memory, for example, at least one magnetic disk memory. The memory 1005 may alternatively be at least one storage apparatus located away from the processor 1001. As shown in FIG. 13, the memory 1005 used as a computer storage medium may include an operating system, a network communication module, a user interface module, and a device-control application.

In the computer device 1000 shown in FIG. 13, the network interface 1004 may provide a network communication function, the user interface 1003 is mainly configured to provide an input interface for a user, and the processor 1001 may be configured to invoke the device-control application stored in the memory 1005 to implement the method provided in the foregoing embodiments, for example, implement the following steps:

receiving a first block broadcast by a second consensus node in a second consensus sub-network, the second consensus sub-network including K consensus nodes in the N consensus nodes, and both the first consensus node and the second consensus node belonging to the second consensus sub-network, K being a positive integer less than N; the second consensus node being any one of the N consensus nodes other than the first consensus node; and a consensus process for the first block being initiated by the first master node;

performing consensus processing on the first block in the second consensus sub-network, to obtain a consensus result of the first consensus node for the first block; in response to determining that the consensus result of the first consensus node for the first block is a consensus success result, broadcasting the first block in a first consensus sub-network to which the first consensus node belongs, to continue to perform consensus processing on the first block in the first consensus sub-network, the first consensus sub-network including M consensus nodes in the N consensus nodes, and M being a positive integer less than N; and broadcasting the consensus success result of the first consensus node for the first block in the consensus network, obtaining a first quantity of consensus success results for the first block in the consensus network, and performing on-chain processing on the first block based on the first quantity.

It is to be understood that the computer device 1000 described in this embodiment of this application can implement the descriptions of the data processing method for a consensus network in the foregoing embodiment corresponding to FIG. 3, and can also implement the descriptions of the data processing apparatus 1 for a consensus network in the foregoing embodiment corresponding to FIG. 12. Details are not described herein again. In addition, the descriptions of beneficial effects of the same method are not described herein again.

In addition, this application further provides a computer-readable storage medium. The computer-readable storage medium stores a computer program executed by the data processing apparatus 1 for a consensus network mentioned above, and the computer program includes program instructions. When executing the program instructions, the processor can perform the descriptions of the data processing method for a consensus network in the foregoing embodiment corresponding to FIG. 3. Therefore, details are not described herein again. In addition, the descriptions of beneficial effects of the same method are not described herein again. For technical details that are not disclosed in the computer storage medium embodiments of this application, refer to the descriptions of the method embodiments of this application.

In an example, program instructions may be deployed on one computer device for execution, or may be executed on a plurality of computer devices at one location, or may be executed on a plurality of computer devices that are distributed at a plurality of locations and that are interconnected through a communication network. The plurality of computer devices that are distributed at a plurality of locations and that are interconnected through a communication network may form a blockchain system.

The foregoing computer-readable storage medium may be the data processing apparatus for a consensus network provided in any one of the foregoing embodiments or an internal storage unit of the foregoing computer device, for example, a hard disk or an internal memory of the computer device. The computer-readable storage medium may alternatively be an external storage device of the computer device, for example, a removable hard disk, a smart media card (SMC), a secure digital (SD) card, or a flash card equipped on the computer device. Further, the computer-readable storage medium may also include both the internal storage unit and the external storage device of the computer device. The computer-readable storage medium is configured to store the computer program and another program and data that are required by the computer device. The computer-readable storage medium may further be configured to temporarily store data that has been output or data to be output.

This application provides a computer program product. The computer program product includes a computer program, and the computer program is stored in a computer-readable storage medium. A processor of a computer device reads the computer program from the computer-readable storage medium, and the processor executes the computer program, so that the computer device describes the data processing method for a consensus network in the embodiment corresponding to FIG. 3. Therefore, details are not described herein again. In addition, the descriptions of beneficial effects of the same method are not described herein again. For technical details that are not disclosed in the computer-readable storage medium embodiments of this application, refer to the descriptions of the method embodiments of this application.

In the specification, claims, and accompanying drawings of the embodiments of this application, the terms "first", "second" or the like are intended to distinguish between different objects but do not indicate a particular order. In addition, the terms "include" and any variant thereof are intended to cover a non-exclusive inclusion. For example, a process, method, apparatus, product, or device that includes a series of operations or modules is not limited to the listed operations or modules; and instead, further includes an operation or module that is not listed, or further includes another operation or module that is intrinsic to the process, method, apparatus, product, or device.

A person of ordinary skill in the art may be aware that the units and operations in the examples described with reference to the embodiments disclosed herein may be implemented by electronic hardware, computer software, or a combination thereof. To clearly describe the interchangeability between the hardware and the software, the foregoing has generally described compositions and operations of each example according to functions. Whether the functions are performed by hardware or software depends on particular applications and design constraint conditions of the technical solutions. A person skilled in the art may use different methods to implement the described functions for each particular application, but it is not to be considered that the implementation goes beyond the scope of this application. In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit.

The method and the related apparatus provided in the embodiments of this application are described with reference to the method flowcharts and/or schematic structural diagrams provided in the embodiments of this application. Specifically, each process and/or block of the method flowcharts and/or schematic structural diagrams, and a combination of processes and/or blocks in the flowcharts and/or block diagrams, may be implemented by using computer program instructions. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the schematic structural diagrams. The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A data processing method for a consensus network, the consensus network comprising N consensus nodes including a first consensus node and a second consensus node, N being a positive integer; and the method performed by the first consensus node and comprising:

in response to a consensus process for a first block being initiated by a first master node of the consensus network, receiving, by the first consensus node, the first block broadcast from the second consensus node in a second consensus sub-network, the second consensus sub-network comprising K consensus nodes in the N consensus nodes and including both the first consensus node and the second consensus node, K being a positive integer less than N;

performing, by the first consensus node, consensus processing on the first block in the second consensus sub-network, to obtain a consensus result of the first consensus node for the first block; and in response to determining that the consensus result of the first consensus node for the first block is a consensus success result, wherein the consensus success result is a member of a node signature set associated with the first block, each member in the node signature set being associated with a respective consensus node, broadcasting, by the first consensus node, the first block to a first consensus sub-network to which the first consensus node belongs, to continue to perform consensus processing on the first block in the first consensus sub-network, the first consensus sub-network comprising M consensus nodes in the N consensus nodes, M being a positive integer less than N, receiving, by the first consensus node, node signatures broadcast by third remaining consensus nodes for the first block, wherein the third remaining consensus nodes are consensus nodes in the N consensus nodes other than the first consensus node;

adding, by the first consensus node, the received node signatures to the node signature set; and obtaining, by the first consensus node, a first quantity of node signatures in the node signature set, wherein an on-chain processing is performed on the first block based on the first quantity of consensus success results for the first block in the consensus network being greater than or equal to a quantity threshold.

2. The method according to claim 1, wherein first remaining consensus nodes in the K consensus nodes are K−1 consensus nodes that are selected by the second consensus node from the N consensus nodes and that are in communication with the second consensus node, and the first remaining consensus nodes are consensus nodes in the K consensus nodes other than the second consensus node; and second remaining consensus nodes in the M consensus nodes are M−1 consensus nodes that are selected by the first consensus node from the N consensus nodes and that are in communication with the first consensus node, and the second remaining consensus nodes are consensus nodes in the M consensus nodes other than the first consensus node; and the first block broadcast from the second consensus node is broadcast by a third consensus node in the N consensus nodes to the second consensus node.

3. The method according to claim 1, wherein the K consensus nodes comprises a second master node when the second consensus node is the first master node, wherein the second master node is a next master node that is in the N consensus nodes and that is configured to perform master node rotation on the first master node; and the second master node is configured to initiate a consensus process for a second block in the consensus network after determining that a consensus result of the second consensus node for the first block is a consensus success result, and a block height corresponding to the second block is a next block height of a block height corresponding to the first block.

4. The method according to claim 1, wherein a block height corresponding to the first block is a first block height; and the method further comprises:

obtaining, by the first consensus node, a third block on which consensus processing is to be performed, wherein the third block is a block that is initiated by a third master node when the third master node does not obtain the first block within a preset time period, a block height corresponding to the third block is the first block height, and the third master node is a consensus node in the N consensus nodes that is after the first master node and that is configured to perform master node rotation;

performing, by the first consensus node, consensus processing on the third block; and caching, by the first consensus node, the third block when consensus processing on the third block is completed.

5. The method according to claim 4, wherein the method further comprises:

caching, by the first consensus node, the first block when consensus processing on the first block is completed;

when a second quantity of consensus success results for the third block in the consensus network is obtained, and the second quantity is greater than or equal to a quantity threshold, performing, by the first consensus node, on-chain processing on the third block, and deleting, by the first consensus node, the cached first block.

6. The method according to claim 5, wherein the method further comprises:

determining, by the first consensus node, that the first quantity is greater than or equal to the quantity threshold; and performing, by the first consensus node, on-chain processing on the first block, and deleting, by the first consensus node, the cached third block.

7. The method according to claim 5, wherein the method further comprises:

determining, by the first consensus node, a block weight of the first block based on a quantity of child blocks of the cached first block; and determining, by the first consensus node, a block weight of the third block based on a quantity of child blocks of the cached third block, wherein the block weight of the first block and the block weight of the third block are used for determining a parent block of a fourth block, a block height corresponding to the fourth block is a second block height, and the second block height is a next block height of the first block height.

8. The method according to claim 7, wherein the method further comprises:

obtaining, by the first consensus node, the fourth block on which consensus processing is to be performed;

when the block weight of the first block is greater than the block weight of the third block, using, by the first consensus node, the first block as the parent block of the fourth block, and performing, by the first consensus node, consensus processing on the fourth block; and when the block weight of the first block is less than the block weight of the third block, using, by the first consensus node, the third block as the parent block of the fourth block, and performing, by the first consensus node, consensus processing on the fourth block.

9. The method according to claim 8, wherein the method further comprises:

when it is determined that a quantity of consensus success results for the fourth block in the consensus network is greater than or equal to the quantity threshold, and the parent block of the fourth block is the first block, deleting, by the first consensus node, the cached third block and a same-level block of the fourth block, and performing, by the first consensus node, on-chain processing on the first block and the fourth block; and when it is determined that the quantity of consensus success results for the fourth block in the consensus networks is greater than or equal to the quantity threshold, and the parent block of the fourth block is the third block, deleting, by the first consensus node, the cached first block and the same-level block of the fourth block, and performing, by the first consensus node, on-chain processing on the third block and the fourth block, wherein the same-level block is a block whose block height is the same as a block height corresponding to the block, and the first block and the third block are same-level blocks of each other.

10. The method according to claim 8, wherein the method further comprises:

caching, by the first consensus node, the fourth block when consensus processing on the fourth block is completed; and updating, by the first consensus node, the block weight of the first block, the block weight of the third block, and a block weight of the fourth block based on the cached fourth block and the parent block of the fourth block.

11. A computer device acting as a first consensus node of a consensus network that comprises N consensus nodes including the first consensus node and a second consensus node, N being a positive integer, the computer device comprising a memory and a processor, the memory storing a computer program, and the computer program, when executed by the processor, causing the first consensus node to perform a data processing method for the consensus network including:

in response to a consensus process for a first block being initiated by a first master node of the consensus network, receiving, by the first consensus node, the first block broadcast from the second consensus node in a second consensus sub-network, the second consensus sub-network comprising K consensus nodes in the N consensus nodes and including both the first consensus node and the second consensus node, K being a positive integer less than N;

performing, by the first consensus node, consensus processing on the first block in the second consensus sub-network, to obtain a consensus result of the first consensus node for the first block; and in response to determining that the consensus result of the first consensus node for the first block is a consensus success result, wherein the consensus success result is a member of a node signature set associated with the first block, each member in the node signature set being associated with a respective consensus node, broadcasting, by the first consensus node, the first block to a first consensus sub-network to which the first consensus node belongs, to continue to perform consensus processing on the first block in the first consensus sub-network, the first consensus sub-network comprising M consensus nodes in the N consensus nodes, M being a positive integer less than N, receiving, by the first consensus node, node signatures broadcast by third remaining consensus nodes for the first block, wherein the third remaining consensus nodes are consensus nodes in the N consensus nodes other than the first consensus node;

adding, by the first consensus node, the received node signatures to the node signature set; and obtaining, by the first consensus node, a first quantity of node signatures in the node signature set, wherein an on-chain processing is performed on the first block based on the first quantity of consensus success results for the first block in the consensus network being greater than or equal to a quantity threshold.

12. The computer device according to claim 11, wherein first remaining consensus nodes in the K consensus nodes are K−1 consensus nodes that are selected by the second consensus node from the N consensus nodes and that are in communication with the second consensus node, and the first remaining consensus nodes are consensus nodes in the K consensus nodes other than the second consensus node; and second remaining consensus nodes in the M consensus nodes are M−1 consensus nodes that are selected by the first consensus node from the N consensus nodes and that are in communication with the first consensus node, and the second remaining consensus nodes are consensus nodes in the M consensus nodes other than the first consensus node; and the first block broadcast from the second consensus node is broadcast by a third consensus node in the N consensus nodes to the second consensus node.

13. He computer device according to claim 11, wherein the K consensus nodes comprises a second master node when the second consensus node is the first master node, wherein the second master node is a next master node that is in the N consensus nodes and that is configured to perform master node rotation on the first master node; and the second master node is configured to initiate a consensus process for a second block in the consensus network after determining that a consensus result of the second consensus node for the first block is a consensus success result, and a block height corresponding to the second block is a next block height of a block height corresponding to the first block.

14. The computer device according to claim 11, wherein a block height corresponding to the first block is a first block height; and the method further comprises:

obtaining, by the first consensus node, a third block on which consensus processing is to be performed, wherein the third block is a block that is initiated by a third master node when the third master node does not obtain the first block within a preset time period, a block height corresponding to the third block is the first block height, and the third master node is a consensus node in the N consensus nodes that is after the first master node and that is configured to perform master node rotation;

performing, by the first consensus node, consensus processing on the third block; and caching, by the first consensus node, the third block when consensus processing on the third block is completed.

15. A non-transitory computer-readable storage medium, storing a computer program that, when executed by a processor of a computer device acting as a first consensus node of a consensus network that comprises N consensus nodes including the first consensus node and a second consensus node, N being a positive integer, causes the first consensus node to perform a data processing method for the consensus network including:

in response to a consensus process for a first block being initiated by a first master node of the consensus network, receiving, by the first consensus node, the first block broadcast from the second consensus node in a second consensus sub-network, the second consensus sub-network comprising K consensus nodes in the N consensus nodes and including both the first consensus node and the second consensus node, K being a positive integer less than N;

performing, by the first consensus node, consensus processing on the first block in the second consensus sub-network, to obtain a consensus result of the first consensus node for the first block; and in response to determining that the consensus result of the first consensus node for the first block is a consensus success result, wherein the consensus success result is a member of a node signature set associated with the first block, each member in the node signature set being associated with a respective consensus node, broadcasting, by the first consensus node, the first block to a first consensus sub-network to which the first consensus node belongs, to continue to perform consensus processing on the first block in the first consensus sub-network, the first consensus sub-network comprising M consensus nodes in the N consensus nodes, M being a positive integer less than N, receiving, by the first consensus node, node signatures broadcast by third remaining consensus nodes for the first block, wherein the third remaining consensus nodes are consensus nodes in the N consensus nodes other than the first consensus node;

adding, by the first consensus node the received node signatures to the node signature set; and obtaining, by the first consensus node, a first quantity of node signatures in the node signature set, wherein an on-chain processing is performed on the first block based on the first quantity of consensus success results for the first block in the consensus network being greater than or equal to a quantity threshold.

16. The non-transitory computer-readable storage medium according to claim 15, wherein first remaining consensus nodes in the K consensus nodes are K−1 consensus nodes that are selected by the second consensus node from the N consensus nodes and that are in communication with the second consensus node, and the first remaining consensus nodes are consensus nodes in the K consensus nodes other than the second consensus node; and second remaining consensus nodes in the M consensus nodes are M−1 consensus nodes that are selected by the first consensus node from the N consensus nodes and that are in communication with the first consensus node, and the second remaining consensus nodes are consensus nodes in the M consensus nodes other than the first consensus node; and the first block broadcast from the second consensus node is broadcast by a third consensus node in the N consensus nodes to the second consensus node.

17. The non-transitory computer-readable storage medium according to claim 15, wherein the K consensus nodes comprises a second master node when the second consensus node is the first master node, wherein the second master node is a next master node that is in the N consensus nodes and that is configured to perform master node rotation on the first master node; and the second master node is configured to initiate a consensus process for a second block in the consensus network after determining that a consensus result of the second consensus node for the first block is a consensus success result, and a block height corresponding to the second block is a next block height of a block height corresponding to the first block.

18. The non-transitory computer-readable storage medium according to claim 15, wherein a block height corresponding to the first block is a first block height; and the method further comprises:

obtaining, by the first consensus node, a third block on which consensus processing is to be performed, wherein the third block is a block that is initiated by a third master node when the third master node does not obtain the first block within a preset time period, a block height corresponding to the third block is the first block height, and the third master node is a consensus node in the N consensus nodes that is after the first master node and that is configured to perform master node rotation;

performing, by the first consensus node, consensus processing on the third block; and caching, by the first consensus node, the third block when consensus processing on the third block is completed.

* * * * *